US012620123B2

(12) United States Patent
Roa et al.

(10) Patent No.: US 12,620,123 B2
(45) Date of Patent: May 5, 2026

(54) GUIDED MATERIAL DATA COLLECTION

(71) Applicant: Centric Software, Inc., Campbell, CA (US)

(72) Inventors: Humberto Roa, Bainbridge Island, WA (US); Rammohan Akula, Santa Clara, CA (US); Fabrice Canonge, Coral Gables, FL (US); Nicholas Fjellberg Swerdlowe, New York, NY (US); Rohit Ghatol, Lewisville, TX (US); Grif Von Holst, Wauwatosa, WI (US)

(73) Assignee: Centric Software, Inc., Campbell, CA (US)

( * ) Notice: Subject to any disclaimer, the term of this patent is extended or adjusted under 35 U.S.C. 154(b) by 453 days.

(21) Appl. No.: 17/446,946

(22) Filed: Sep. 3, 2021

(65) Prior Publication Data

US 2022/0114741 A1 Apr. 14, 2022

Related U.S. Application Data

(63) Continuation of application No. 16/447,949, filed on Jun. 20, 2019, now Pat. No. 11,113,826.

(Continued)

(51) Int. Cl.
*G06T 7/30* (2017.01)
*G06F 16/583* (2019.01)
(Continued)

(52) U.S. Cl.
CPC .............. *G06T 7/73* (2017.01); *G06F 16/583* (2019.01); *G06T 3/4084* (2013.01); *G06T 3/608* (2013.01); *G06T 5/50* (2013.01); *G06T 5/70* (2024.01); *G06T 5/80* (2024.01); *G06T 7/13* (2017.01); *G06T 7/30* (2017.01); *G06T 7/529* (2017.01); *G06T 7/70* (2017.01); *G06T 7/90* (2017.01); *G06T 11/001* (2013.01); *G06T 15/04* (2013.01);

(Continued)

(58) Field of Classification Search
CPC ....................................................... G06T 7/73
See application file for complete search history.

(56) References Cited

U.S. PATENT DOCUMENTS 10,008,039 B1 * 6/2018 Neustein ............ G06Q 30/0643
2008/0211779 A1 * 9/2008 Pryor ................... G06F 3/0425
345/173

(Continued)

OTHER PUBLICATIONS

Grymala ("Prime Ruler—Length measurement by camera and screen", Jun. 7, 2018, Website: https://www.youtube.com/watch?v=tKfwgkUjWaE) (Year: 2018).*

(Continued)

*Primary Examiner* — Oneal R Mistry
(74) *Attorney, Agent, or Firm* — Aka Chan LLP

(57) ABSTRACT

A material data collection system allows capturing of material data. For example, the material data collection system may include digital image data for materials. The material data collection system may ensure that captured digital image data is properly aligned, so that material data may be easily recalled for later use, while maintaining the proper alignment for the captured digital image. The material data collection system may include using a capture guide, to provide cues on how to orient a mobile device used with the material data collection system.

14 Claims, 13 Drawing Sheets

Related U.S. Application Data

(60) Provisional application No. 62/687,741, filed on Jun. 20, 2018.

(51) Int. Cl.

| | |
|---|---|
| *G06T 3/4084* | (2024.01) |
| *G06T 3/608* | (2024.01) |
| *G06T 5/50* | (2006.01) |
| *G06T 5/70* | (2024.01) |
| *G06T 5/80* | (2024.01) |
| *G06T 7/13* | (2017.01) |
| *G06T 7/529* | (2017.01) |
| *G06T 7/70* | (2017.01) |
| *G06T 7/73* | (2017.01) |
| *G06T 7/90* | (2017.01) |
| *G06T 11/00* | (2006.01) |
| *G06T 15/04* | (2011.01) |

(52) U.S. Cl.
CPC ..................... *G06F 2218/00* (2023.01); *G06T 2207/20132* (2013.01); *G06T 2207/20192* (2013.01); *G06T 2207/30124* (2013.01); *G06T 2207/30204* (2013.01); *G06T 2210/16* (2013.01)

(56) References Cited

U.S. PATENT DOCUMENTS

| | | | | |
|---|---|---|---|---|
| 2014/0247279 | A1* | 9/2014 | Nicholas ................. | G06F 3/011 |
| | | | | 345/633 |
| 2018/0188113 | A1* | 7/2018 | Chang ..................... | G01J 3/462 |
| 2019/0306411 | A1* | 10/2019 | Lusk ......................... | G06T 7/70 |
| 2019/0323157 | A1* | 10/2019 | Wilson ................. | G05B 19/408 |
| 2019/0333266 | A1* | 10/2019 | O'Brien ............... | G06T 15/506 |
| 2019/0347526 | A1* | 11/2019 | Sunkavalli ............. | G06V 10/60 |
| 2019/0392613 | A1* | 12/2019 | Roa ........................... | G06T 3/00 |
| 2020/0195826 | A1* | 6/2020 | Seiffert ................. | H04N 23/56 |

OTHER PUBLICATIONS

Yildiz, Kazim, Dimensionality Reduction-based Feature Extraction and Classification on Fleece Fabric Images, Jul. 22, 2016, pp. 317-323, SIViP (2017) 11, Springer-Verlag London 2016.

* cited by examiner

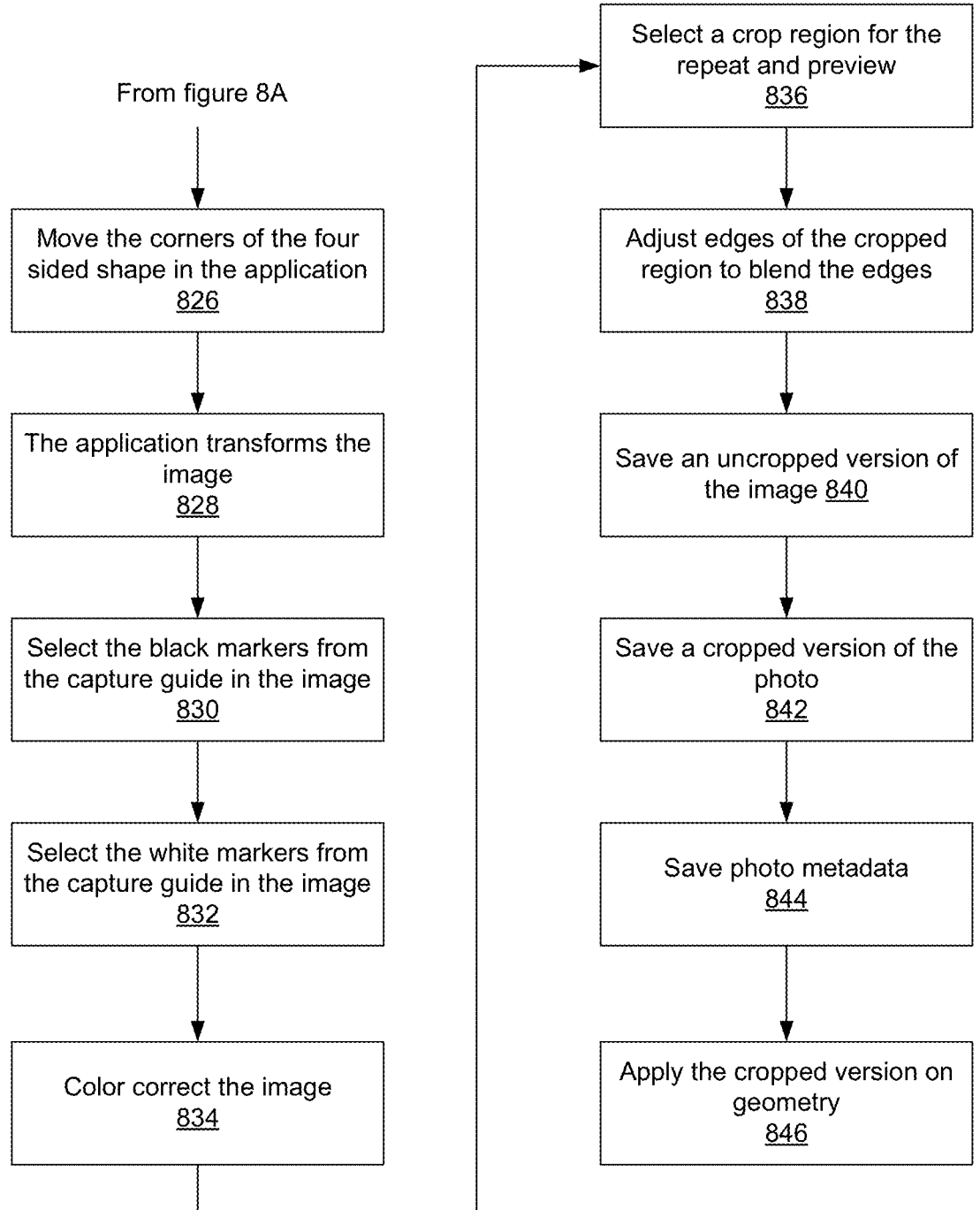

From figure 8A

Move the corners of the four sided shape in the application
826

The application transforms the image
828

Select the black markers from the capture guide in the image
830

Select the white markers from the capture guide in the image
832

Color correct the image
834

Select a crop region for the repeat and preview
836

Adjust edges of the cropped region to blend the edges
838

Save an uncropped version of the image 840

Save a cropped version of the photo
842

Save photo metadata
844

Apply the cropped version on geometry
846

Figure 8B

GUIDED MATERIAL DATA COLLECTION

CROSS-REFERENCE TO RELATED APPLICATIONS

This application is a continuation of U.S. patent application Ser. No. 16/447,949, filed Jun. 20, 2019, issued as U.S. Pat. No. 11,113,826 on Sep. 7, 2021, which claims the benefit of U.S. patent application 62/687,741, filed Jun. 20, 2018. These applications are incorporated by reference along with all other references cited in this application.

BACKGROUND OF THE INVENTION

This invention relates to digital imaging technology and, more specifically, a process that uses a handheld device and a capture guide to capture data of sample materials used to construct products such as clothing, jewelry, or other products.

Designers, manufacturers, and others involved in product production get their inspiration for products when personally handling samples of materials. For example, a clothing designer may be presented with and inspired by a particular fabric they encounter in real-life, for use in creating a garment they are working on. However, it is often difficult for the designer to collaborate with others, since there is no way to easily capture and share information about the particular fabric.

One way to do so is by keeping actual physical samples of materials in a library. When a particular sample is needed, the sample is found and shipped. This makes it difficult for designers to work collaboratively, especially with those whom may be at different locations.

Further, while material manufacturers may provide basic information such as the color, pattern, and elements used to create a material, this information often lacks the specificity that a designer may need in the future to use a material in production. Since each manufacturer may also not adhere to the same nomenclature as other manufacturers to describe attributes of their materials, it is difficult for the designer to view, choose, and understand how different materials may look together or how they would work for a final product by using the manufacturer provided descriptions alone. For example, manufacturers may classify different blues differently than other manufactures or describe particular patterns differently.

Some designers work with photos of materials, taken using a flatbed scanner. However, flatbed scanners are not portable, and require the user to go to the scanner in order to capture data. A flatbed scanner also takes poor images of materials with texture, like pebbled leather, which limits its usefulness.

Therefore, there is a need to allow accurate and useful data collection about materials.

BRIEF SUMMARY OF THE INVENTION

In an implementation, a material data collection system allows capturing of material data. The material data collection system allows the conversion of real-world materials in a physical space, into a high-quality digital asset in the virtual space that may be searched, shared, and used by others. For example, the material data collection system may include digital image data for materials. The material may be any type of material whose information is to be stored in the material data collection system, such as fabric, knits, weaves, skins or hides, vinyl, plastics, composites, textiles, cotton, flax, wool, ramie, silk, denim, nylon, polyester, or many other materials. The material data collection system may ensure that captured digital image data is properly aligned, so that material data may be easily recalled for later use, while maintaining the proper alignment for the captured digital image. The material data collection system may include using a capture guide, to provide cues on how to orient a mobile device used with the material data collection system. An application installed on the mobile device may offer additional options to properly orient digital image data captured by the mobile device. This may provide various benefits. For example, mobile devices may vary from other based on its model, manufacturer, defects found in its parts, or other factors. This may result in aberrations that may affect digital image data captured by the material data collection system, such as a camera lens defect that produces as a pin-cushion effect, a fisheye effect, or other types of aberrations. The material data collection system may transform digital image data, to remove or reduce these undesirable effects.

In another implementation, the material data collection system may assist a user to correctly hold or position a mobile device when capturing a digital image of a sample material. For example, before capturing the digital image, the mobile device may capture the orientation of a tabletop or other surface that the sample material is placed upon. When the digital image is being captured, the material data collection system may indicate to the user when the orientation of the camera is the same or similar to the orientation of the tabletop. The orientation of the camera is the same or similar to the orientation of the table top when, as measured by a accelerometer, gyroscope, or other similar device, the difference in the tilt, yaw, or roll of the camera and table top is less than a predefined limit (e.g., 1 degree, 2 degrees, 3 degrees, 5 degrees, or any other number of degrees).

In various embodiments, the material data collection system may include lighting information with a captured digital image. For example, one area of a material sample may be brighter than another, because of a light source that is casting light more on one area of the material sample than another. A capture guide included in a captured digital image may include one or more lighting calibration areas. Depending on differences between the one or more lighting calibration areas, the material data collection system may determine how the lighting in the captured digital image differs across the captured digital image. An example of a technique that may be used include histogram equalization or wavelength normalization.

The material data collection system may also allow users to save metadata with a captured digital image. For example, a user may want to note with a captured digital image a material name, code, orientation, and size. Instead of making notes on paper or using a separate computerized system, the user may enter this information into the material data collection system and the information is associated with the captured digital image and uploaded to a product lifecycle management system.

In an implementation, the material data collection system includes using an application executing on a mobile device to capture an initial material sample image. The initial material sample image may be a digital image that includes a sample material area and a capture guide area including a capture guide and a first alignment indicator included on the capture guide. The capture guide area may completely enclose at least a portion of the sample material area. The application may determine a first location of the initial material sample image where the first alignment indicator has been captured in the initial material sample image and stores this information as a first matched alignment indicator pair, where the first matched alignment indicator pair associates the first alignment indicator with the first position. The application transforms the initial material sample image, based on the first matched alignment indicator pair, to render an alignment corrected material sample image. Additionally, the application identifies, from the alignment corrected material sample image, a sample material swatch area, where the sample material swatch area includes at least one instance of a pattern found in the initial material sample image and stores on the mobile device the sample material swatch area and the initial material sample image.

In an implementation, the material data collection system allows correcting positions of application provided indicators by a user. For example, the material data collection system may determine initial or a first position for an alignment indicator but allow a user to change the position of the alignment indicator. This includes displaying on the mobile device the initial material sample image overlaid with a first application provided alignment indicator at a first position. For example, there may include a base image layer with the initial material sample image. An application generated layer, including the first alignment indicator, may be overlaid over the base image layer. While displaying the initial material sample image, the material data collection system may receive a first adjustment of the first application provided alignment indicator from the first position to a second position to associate the first application provided alignment indicator with the first alignment indicator shown on the initial material sample image to create a first matched alignment indicator pair. For example, the first matched alignment indicator pair associates the first alignment indicator with the first application provided alignment indicator at the second position and not the first position. The association may be made by dragging the first application provided alignment indicator to the second position where, according to the user, the first alignment indicator of the capture guide appears on the base image layer. The first application provided alignment indicator at the second position may be displayed on the mobile device.

The material data collection system may include transforming the initial material sample image, based on the first matched alignment indicator pair, to render an alignment corrected material sample image. For example, while displaying on the mobile device the initial material sample image overlaid with the first application provided alignment indicator at the first position may also include a second application provided alignment indicator at a third position. The material data collection system may receive a second adjustment of the second application provided alignment indicator from the third position to a fourth position to associate the second application provided alignment indicator with the second alignment indicator shown on the initial material sample image to create a second matched alignment indicator pair. The material data collection system may transform the initial material sample image based upon a straight line determined by the first matched alignment indicator pair and the second matched alignment indicator pair, to render an alignment corrected material sample image. The material data collection system may also include identifying, from the alignment corrected material sample image, a sample material swatch area, where the sample material swatch area includes at least one instance of a pattern found in the initial material sample image and storing on the mobile device the sample material swatch area and the initial material sample image. The initial material sample image may also be uploaded to a product lifecycle management software for later retrieval and use.

The material data collection system may also include transforming the initial material sample image by compensating, based on the first match alignment indicator pair, for at least a lens aberration introduced by a lens of the mobile device when capturing the initial material sample image. The first adjustment may include selecting the first application provided alignment indicator on a touch screen of the mobile device and moving the first application provided alignment indicator from the first position to the second position. A check may be performed by the material data collection system to determine that the first application provided alignment indicator is associated with the first alignment indicator shown on the initial material sample image. For example, each application provided alignment indicator may be associated to only one alignment guide of the capture guide.

In an implementation, the material data collection system may include only a portion of the initial material sample image. This may be due to display size limitations of the mobile device or correction by the material data collection system to optimize display of the capture guide and the sample material within a cut out area of the capture guide. The cut-out portion may be of any size and shape. For example, the cut-out shape may form a bounded polygon or a partially bounded polygon. The bounded polygon may be identified by the material data collection system without a user providing input as to where the bounded polygon is shown in the initial material sample image. For example, a user is not required to identify lines or points that define where the bounded polygon is shown in the image.

In another implementation, the material data collection system includes before capturing the initial material sample image, taking an orientation of a sample material and capture guide by the mobile device. For example, the mobile device may be laid upon a tabletop or other surface that the capture guide is resting upon to record the orientation of the tabletop. Before capturing the initial material sample image, the material data collection system includes providing visual feedback indicating whether at a given time the mobile device is in the same orientation of the sample material and capture guide. Some examples of visual indication may include a number of degrees or a direction to tilt the mobile device in order to orient the mobile device in a similar orientation as the orientation of the sample material. An accelerometer of the mobile device may be used to capture orientation information. The method may also include before capturing the initial material sample image, taking an orientation of a sample material and capture guide by the mobile device; before capturing the initial material sample image and after a user input to capture the initial material sample image, accessing an accelerometer of the mobile device to determine whether at a given time the mobile device is in a similar orientation of the sample material and capture guide; at a first time when the mobile device is not in a similar orientation of the sample material and capture guide, determining to not capture the initial material sample image; and at a second time when the mobile device is in a similar orientation of the sample material and capture guide, capturing the initial material sample image, without user input to capture the initial material sample image at the second time. The second time may be after the first time.

Various pieces of metadata may be captured by the material data collection system and associated with the sample material swatch area. For example, this may include an International Standards Organization (ISO) sensitivity when the initial material sample image was captured and the second position for the first application provided alignment indicator. The sample material swatch area may be used in rendering a three-dimensional model on a geometric form, where the rendered three-dimensional model includes at least a portion of a surface of the three-dimensional model including the sample material swatch area. The surface of the three-dimensional model may include at least two or more copies of the sample material swatch area. Copies of the sample material swatch area may be only partial copies of the sample material swatch area. For example, smaller sample material swatch areas may need to be duplicated over ten times to be large enough to cover a surface of a geometric form. Edges of the geometry may not require an entire copy of the sample material swatch area and the material data collection system may identify and adjust the size of the copy accordingly.

In various implementations, transforming the initial material sample image, may be based upon a bounded polygon formed using a set of application provided alignment indicators, to render an alignment corrected material sample image. The set of alignment indicators may include four alignment indicators and the bounded polygon includes an irregular polygon. The set of alignment indicators included on the capture guide may form a regular polygon. The transformed initial material sample image may be used to identify a sample material swatch area, where the sample material swatch area includes at least one instance of a pattern found in the initial material sample image and stored on the mobile device the sample material swatch area and the initial material sample image. The sample material swatch area may be used to render a three-dimensional model on a geometric form, where the rendered three-dimensional model includes at least a portion of a surface of the three-dimensional model including the sample material swatch area.

In an implementation, the material data collection system includes providing a sample material and a capture guide on top of the sample material. The capture guide may include a cut out portion that allows at least a portion of the sample material to appear while the capture guide is on top of the sample material. For example, the sample material may be placed on a tabletop, which is made of steel or other magnetic material. The capture guide may include magnets or other types of fasteners that allow a user to move the capture guide or the sample material to prepare for capturing a digital image. For example, the sample material may be adjusted to eliminate or reduce creases before the digital image is captured. As another example, the capture guide may be shifted or moved so that a relevant portion of the sample material is shown by the cut-out portion. For instance, an edge of the sample material is moved out of the cut-out portion, a defect of the sample material is moved out of the cut-out portion, or a complete instance of a pattern of the sample material is moved into the cut-out portion. The material data collection system may include capturing a digital image of the sample material and the capture guide on top of the sample material. The material data collection system may include transforming, based on the capture guide captured in the digital image, the portion of the sample material appearing in the cut-out portion. The material data collection system may support various transformations of the captured digital image. For example, the material data collection system may perform one or more of a color calibration of the digital image based on a color marker of the capture guide, a straightening of the digital image based on a straight line defined by the cut out portion of the capture guide, or a deskewing of the digital image based on a polygon formed by corners of the cut out portion. The material data collection system may determine a material swatch for the sample material, where the material swatch includes only the portion of the sample material visible in the cut-out portion.

In an implementation, the material data collection system includes color calibration including comparing, based on two different markers on the capture guide that are of the same color, a color differential for the two different markers as captured in the digital image. The color differential may include a difference in luminance of one marker as compared to the other marker. The material data collection system may include determining, based on the color differential, a gradient to compensate for the color differential of the digital image. For example, the gradient includes adjusting the color values according to the color differential within a preselected color space, such as a luminance value in a YUV color space or other color spaces. The material data collection system may include applying the gradient over the captured digital image by adjusting color values of the captured digital image. The gradient may be applied to points closest to one marker and gradually change until points closer to the other marker, so that the color differential has been minimized or removed. More than two markers may be considered when applying the gradient. Further, the process may be repeated by the material data collection system for markers of different colors.

In an implementation, the material data collection system includes chromaticity corrections. This may include comparing, based on two different white point markers that are visible in the initial material sample image, a chromaticity differential for the two different white point markers; determining, based on the chromaticity differential, a chromaticity gradient to compensate for the chromaticity differential; and applying the chromaticity gradient over the initial material sample image by adjusting chromaticity values. The material data collection system may also perform both chromaticity and color correction. The chromaticity correction may be performed before the color correction.

In an implementation, the material data collection system reduces an edge artifact of the sample material swatch area. The material data collection system includes detecting a computer-readable indication shown on the capture guide area of the initial material sample image; and determining a first direction for a sample material shown in the sample material area using the computer-readable indication. The first direction indicates a construction feature of the sample material. For example, the first direction may be a weft direction like the direction of yarns in a woven fabric (weft and warp). As another example, the direction may be indicating natural features like neck, belly, and tail in animal skins.

In an implementation, the material data collection system includes a recolor feature. This may include converting the sample material swatch area into a grayscale layer; receiving selection of a base color; applying the base color to at least a portion of the grayscale layer, where the applied base color matches the intensity of an original color of the sample material swatch area in the base color.

In an implementation, the material data collection system includes metadata storage of color information. The metadata may include colors spaces different than the color space used in the captured image. This may include receiving selection of a first area from the sample material swatch area or the initial material sample image and a selected color space; translating, from a color at the first area, to a matching color identifier in the selected color space; and storing as metadata with the sample material swatch area or the initial material sample image the matching color identifier.

In an implementation, the material data collection comprises a capture guide, where the capture guide includes: an opening on a top surface of the capture guide, where the opening is surrounded by edges of the capture guide, and at least two alignment markers that are visible on the top surface of the capture guide. The material data collection includes a mobile device, capturing in a digital image at least a portion of the top surface of the capture guide and a sample material, where the digital image is processed to produce a material swatch based on the sample material and the at least two alignment markers. The digital image may include areas of the sample material appearing outside of the opening. Further, the digital image may include objects other than the capture guide or the sample material. In an implementation, a capture guide includes a rectangular frame structure including an exterior edge and an interior edge, where the interior surrounds a perimeter of a rectangular first opening, a first corner of the rectangular frame structure, between the exterior edge and an interior edge, comprises a second opening, in a first direction at a first distance from the second opening, a first alignment structure is formed on an upper surface of the rectangular frame structure, in a second direction at a second distance from the second opening, a second alignment structure is formed on the upper surface of the rectangular frame structure, the second direction is transverse to the first direction; and a metal piece, coupled to the second opening. The second opening may be a circular shape. The first distance is the same as the second distance. The first alignment structure may include grooves formed on the upper surface of the rectangular frame structure and the grooves outline approximately a rectangle or square shape. The second alignment structure may include grooves formed on the upper surface of the rectangular frame structure, and the grooves outline a second rectangular shape, and the first and second rectangular shapes have the same area. The rectangular frame structure may include first ruled markings extending in the first direction and second ruled markings extending in the first direction.

In an implementation, the material data collection includes a method including receiving a digital image of a real-world material sample; analyzing the digital image to determine at least two marker areas found on a capture guide included with the digital image; correcting, based on the at least two marker areas, at least one of an alignment, color, or chromaticity of the digital image; and creating, after correcting the digital image, a cropped version of the digital image including: removing the capture guide from the cropped version of the digital image, identifying at least one pattern of the real-world material sample, and including the at least one pattern of the real-world material sample in the cropped version of the digital image. Including the at least one pattern may include receiving user input to determine the at least one pattern. A tiled image of an initial cropped version of the digital image may be generated to determine whether edges of the pattern match. The at least two marker areas may include at least three different colors and each of the at least two marker areas include the same colors. For example, there may be two different colors used for color correction and one color for brightness correction. These colors may be known before the photo was captured. For example, the capture guide may be manufactured or constructed with these colors predefined, so that these are known colors before the digital image is captured.

Other objects, functionality, and advantages of the present invention will become apparent upon consideration of the following detailed description and the accompanying drawings, in which like reference designations represent like functionality throughout the figures.

BRIEF DESCRIPTION OF THE DRAWINGS

FIGS. 8A-8B show a sample flow of data collection by the material data collection system.

DETAILED DESCRIPTION OF THE INVENTION

Figure 1:
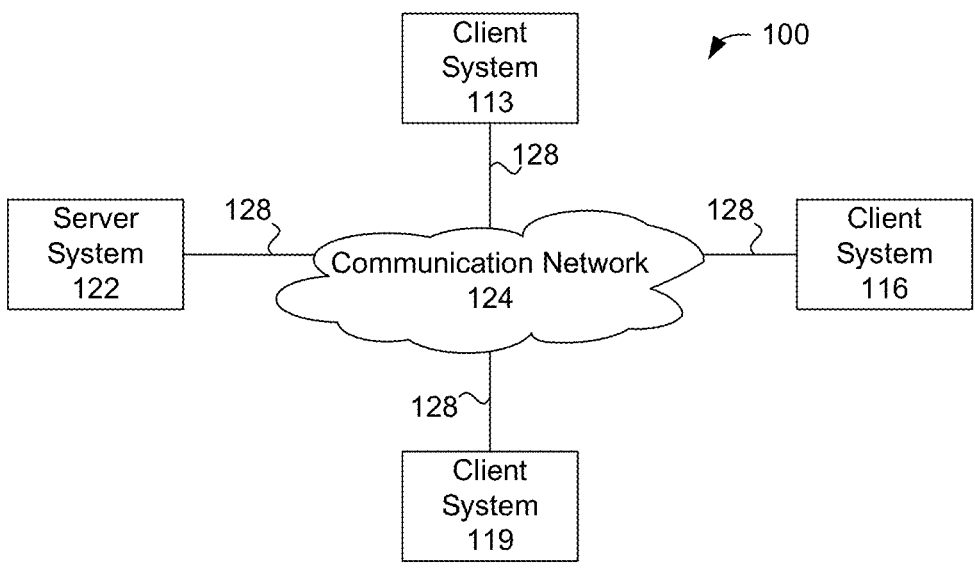
FIG. 1 shows a simplified block diagram of a material data collection system implemented in a distributed computing network connecting a server and clients.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
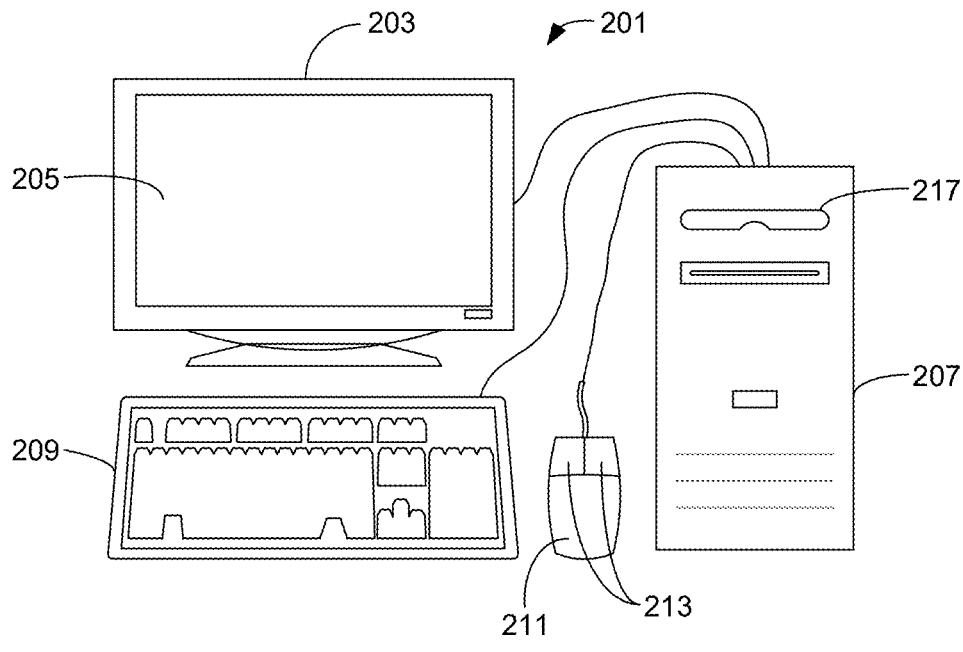
FIG. 2 shows a more detailed diagram of an exemplary client of the material data collection system.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g., Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
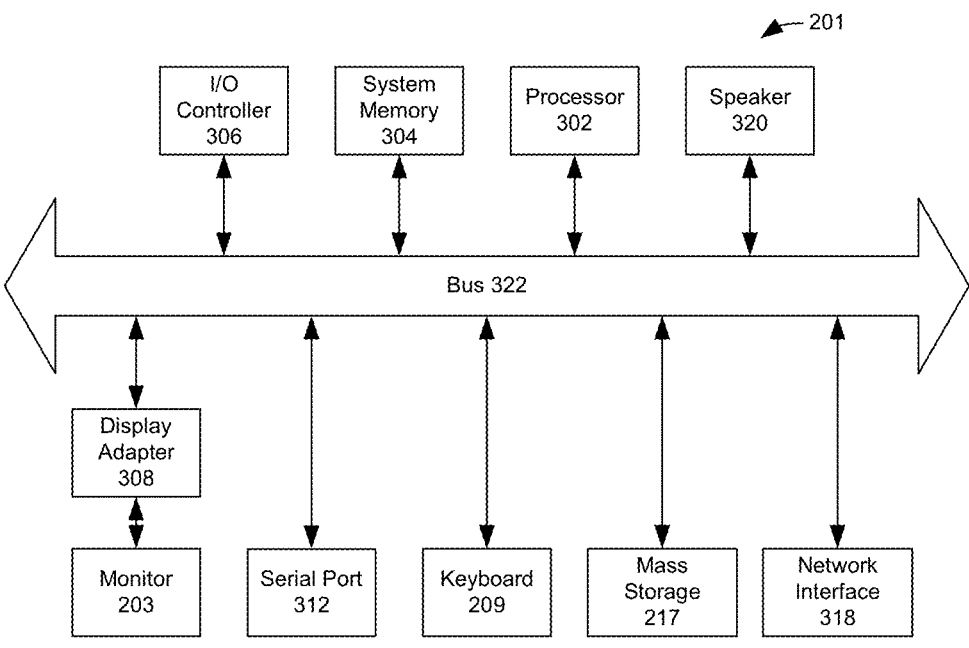
FIG. 3 shows a system block diagram of a client computer system used to execute application programs such as a web browser or performance support tools for the material data collection system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk. In an implementation, the material data collection system uses the Open Graphics Library (OpenGL) application programming interface for rendering 2D and 3D vector graphics.

Figures 4, 5, 6:
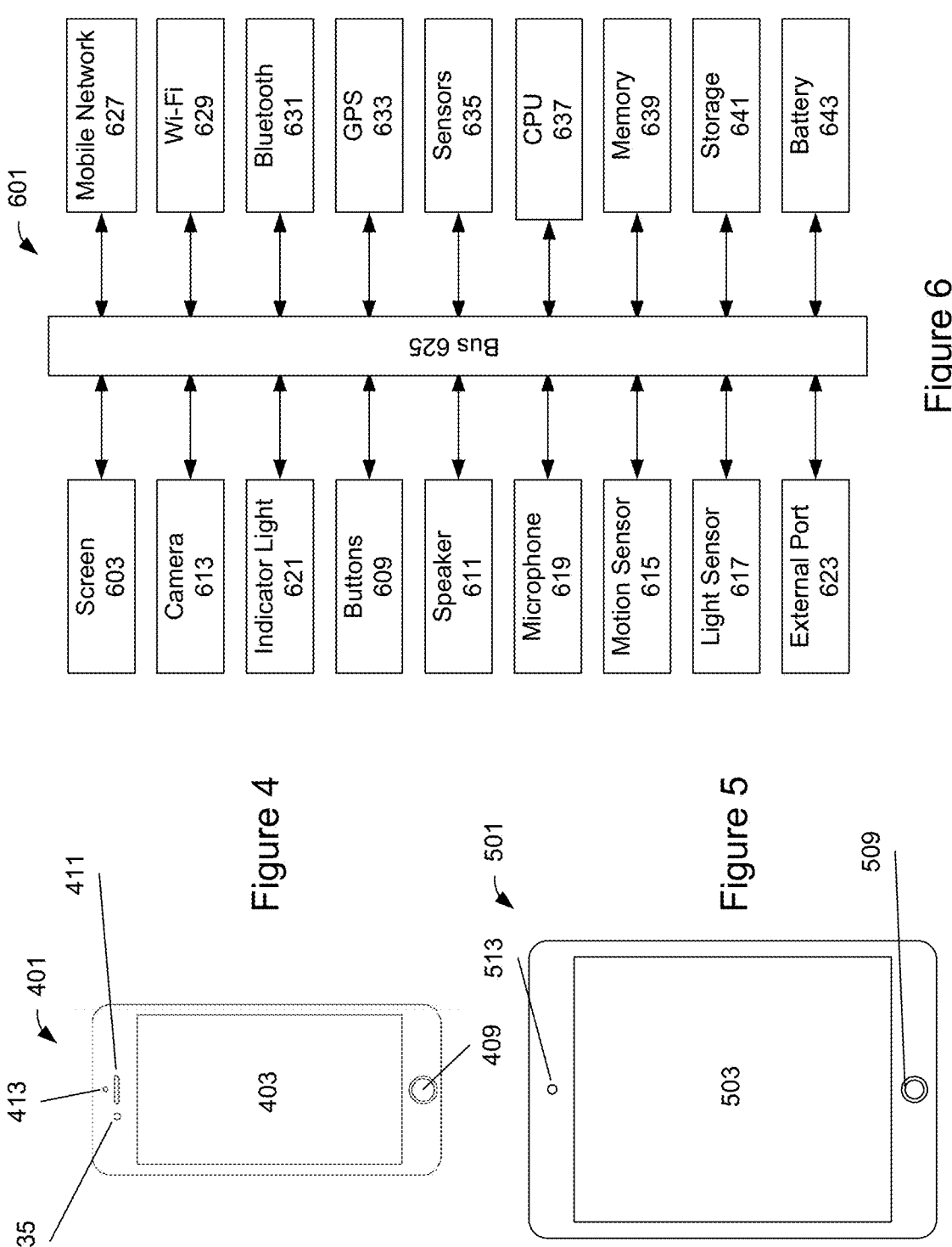
FIGS. 4-5 show examples of mobile devices, which can be mobile clients.
FIG. 6 shows a system block diagram of a mobile device.

FIGS. 4-5 show examples of mobile devices, which can be mobile clients. Mobile devices are specific implementations of a computer, such as described above. FIG. 4 shows a smartphone device 401, and FIG. 5 shows a tablet device 501. Some examples of smartphones include the Apple iPhone, Samsung Galaxy, and Google Nexus family of devices. Some examples of tablet devices include the Apple iPad, Samsung Galaxy Tab, and Google Nexus family of devices.

Smartphone 401 has an enclosure that includes a screen 403, button 409, speaker 411, camera 413, and proximity sensor 435. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 409 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 501 is similar to a smartphone. Tablet 501 has an enclosure that includes a screen 503, button 509, and camera 513. Typically the screen (e.g., touch screen) of a tablet is larger than a smartphone, usually 7, 8, 9, 10, 12, 13, or more inches (measured diagonally).

FIG. 6 shows a system block diagram of mobile device 601 used to execute the software of the present invention. This block diagram is representative of the components of smartphone or tablet device. The mobile device system includes a screen 603 (e.g., touch screen), buttons 609, speaker 611, camera 613, motion sensor 615, light sensor 617, microphone 619, indicator light 621, and external port 623 (e.g., USB port or Apple Lightning port). These components can communicate with each other via a bus 625.

The system includes wireless components such as a mobile network connection 627 (e.g., mobile telephone or mobile data), Wi-Fi 629, Bluetooth 631, GPS 633 (e.g., detect GPS positioning), other sensors 635 such as a proximity sensor, CPU 637, RAM memory 639, storage 641 (e.g. nonvolatile memory), and battery 643 (lithium ion or lithium polymer cell). The battery supplies power to the electronic components and is rechargeable, which allows the system to be mobile.

The following is a high-level flow of the material data collection system when used to capture material data. The flow includes a series of steps, however various embodiments of the material data collection system may include greater or fewer steps than shown by the following flow:

1. Alignment. The material data collection system includes an initial material sample image. For example, the initial material sample image may be captured using a smart phone that includes a digital camera. The digital camera captures the initial material sample image with a sample material area and a capture guide appearing in the initial material sample image. The capture guide may include one or more alignment indicators, used to perform alignment correction in the material data collection system. Any number of alignment indicators may be used by the material data collection system. In an implementation, the material data collection system uses four alignment indicators so that a rectangle or square may be defined using the alignment indicators. Alternate implementations of the material data collection system may use one alignment indicator (to define a circular cut-out portion), two alignment indicators (to indicate diagonal matching corners for a cut-out portion), five alignment indicators, or more.

In an implementation, the alignment indicator may be a visual indication that may be computer readable and recognized automatically by the material data collection system. For example, the visual indication may be shown in the initial sample image and recognized by the material data collection system using optical recognition techniques. Some examples of visual indications include a quick response (QR) code, a symbol (e.g., "plus" sign, cross, dot, circle, or any other symbol), matrix barcode, two-dimensional barcode, linear barcode, or any other type of visual indicator. Alternate embodiments of the alignment indicator may include a non-visual indicator that may be captured and computer recognized. For example, electromagnetic, heat, metallic, or other non-visual indicator may be used. Some examples of electromagnetic indicators include near-field communications (NFC) and radio-frequency identification (RFID). The material data collection system may process the alignment indicator to perform alignment adjustment. For example, the material data collection system will automatically recognize the alignment indicator from the initial material sample image, without user input specifying where the alignment indicator is shown on the initial material sample image. The alignment indicator may define a bounded area of the initial material sample image where the sample material appears. The bounded area may correspond to any shape, such as a circle or a polygon with any number of edges (e.g., 3, 4, 5, 6, 7, or more edges). One or more alignment indicators may be used to define the bounded area. In an implementation, the alignment indicator includes a QR code. A corner of the QR code may correspond to a corner defining an edge of the bounded area. For example, if the bounded area corresponds to a rectangle or square, for an alignment indicator corresponding to a top right corner of the bounded area a bottom left corner of the QR code may indicate where the top right corner of the bounded area should be to the material data collection system, for an alignment indicator corresponding to a top left corner of the bounded area a bottom right corner of the QR code may indicate where the top left corner of the bounded area should be to the material data collection system, for an alignment indicator corresponding to a bottom right corner of the bounded area a top left corner of the QR code may indicate where the bottom right corner of the bounded area should be to the material data collection system, and for an alignment indicator corresponding to a bottom left corner of the bounded area a top right corner of the QR code may indicate where the bottom left corner of the bounded area should be to the material data collection system. The QR code may include computer readable information specifying which corner each respective QR belongs (e.g., the bottom left QR code indicates that the bottom left QR code forms a bottom left corner for a bounded area).

2. Measurement. The initial sample image includes a measurement scale visible on the capture guide. The measurement scale may correspond to any measurement unit, such as meters, inches, centimeters, or any other measurement unit. The measurement scale may be computer readable, so that the material data collection system can understand the dimensions of the sample area shown by the initial material sample image.

3. Lighting. The initial sample image includes color markers to perform lighting correction. The material data collection system may use one or more different color markers to compare and contrast the shown colors to perform the lighting corrections.

4. Rotation. The initial sample image includes orientation indicators. Depending on a type of material of the sample material, the sample material may indicate a direction of how the material should be oriented or a bias direction. For example, woven fabrics may have different directions such as a weft and warp, while other fabric types may have other orientations. A selvage edge may also be indicated for the initial sample image. For example, for a woven fabric, selvage may run parallel to a warp of the fabric. The selvage may indicate an edge of the initial fabric that is self-finished.

Figure 7:
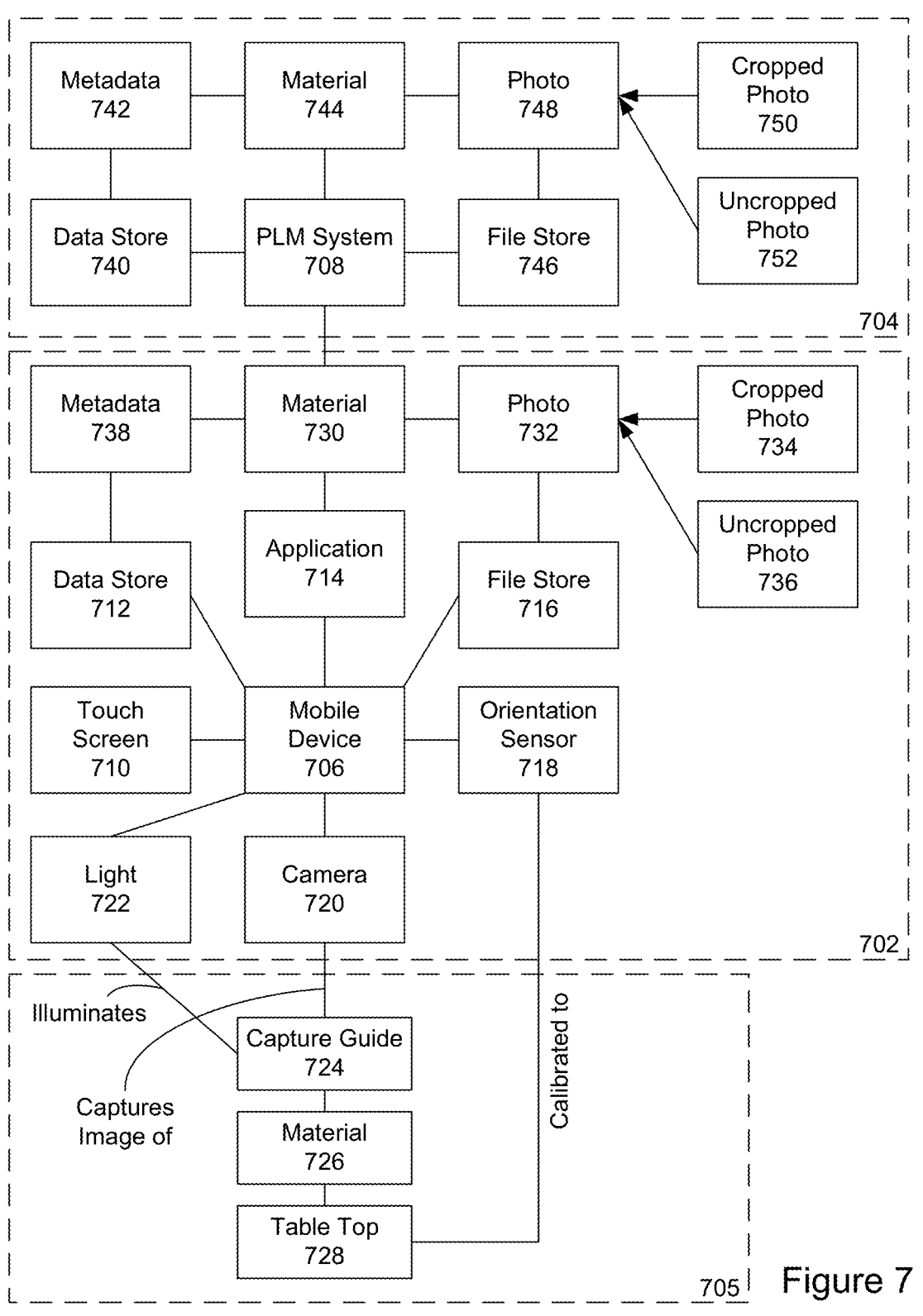
FIG. 7 shows a block relationship diagram of various components of the material data collection system.

FIG. 7 shows a block relationship diagram of various components of the material data collection system. The material data collection system may be divided into three different portions, such as a mobile device portion 702, a product lifecycle management (PLM) system portion 704, and a sample material portion 705. The mobile device category portion 702 includes a mobile device 706 that may be communicatively coupled to a product lifecycle management system 708 included in the product lifecycle management (PLM) system portion 704. The communication may be made through any suitable means, such as a network connection over the Internet, an intranet, BLUETOOTH® network, or other network. The PLM system 708 may be any of a variety of available PLM systems. A specific implementation of the PLM system includes PLM software available from Centric Software, Inc. All public published content by Centric Software, Inc., including Web pages available at www.centricsoftware.com, to the filing date of this patent application is incorporated by reference along with all other cited references in this application. This published content includes Web site pages, user guides and manuals, white papers, and other on-line and paper publications and documentation.

The mobile device 702 and the PLM system 704 may include various hardware and software components. For example, the mobile device 706 may include a touch screen 710 that allows a user to provide information to the mobile device 706. The touch screen 710 may support many different types of touch input, such as a selection, quick press, long press, force press, swipe, drag, or other touch input. The mobile device 706 may include a data store 712. The data store 712 may be configured to selectively upload information from the data store 712, without additional user input, to the PLM system 708. An application 714 may be installed onto the mobile device 706 to provide various functionality of the material data collection system. For example, the application 714 may access through application programming interfaces provided by the mobile device 706 access to various components of the mobile device 706, such as an orientation sensor 718. The orientation sensor 718 may include a three-axis accelerometer. Three-axis indicates that the orientation sensor 718 may measure acceleration forces in three dimensions, so that whether the mobile device 706 is tilted or otherwise moved, the mobile device 706 may capture and quantify the movement. The orientation sensor 718 may be adapted to capture information such as the yaw, pitch, or roll of the mobile device 706. The mobile device 706 may include a camera 720.

The sample material portion 705 may include a capture guide 724, a sample material 726, and a tabletop 728. As explained in greater detail elsewhere in this application, the capture guide 724 is placed on top of the sample material 726. The tabletop 728 may be any flat surface, allowing the capture guide 724 and the sample material 726 to rest flat while a digital image is captured. The mobile device 706 may be calibrated, using the orientation sensor 718, to determine an orientation of the tabletop 728. This may be used to properly align the position of the camera 720, while a digital image is being captured. The camera 720 may capture in a digital image the capture guide 724 and the sample material 726. Optionally, the light 722, such as a camera flash, may illuminate the capture guide 724 and the sample material 726 when the digital image is being captured.

Once a digital image has been captured, a material record 730 is created for the digital image. The material record 730 may include metadata 738 of a sample material and the captured digital image 732. The captured digital image 732 may include a cropped photo 734 and an uncropped photo 736.

The PLM system portion 704 includes the PLM system 708, which stores material records from the mobile device 706 in a data store 740. The data store 740 may include the metadata from material records, image data 748, including a cropped photo 750 and an uncropped photo 752, in a file store 746.

Some specific flows of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application.

Figure 8A:
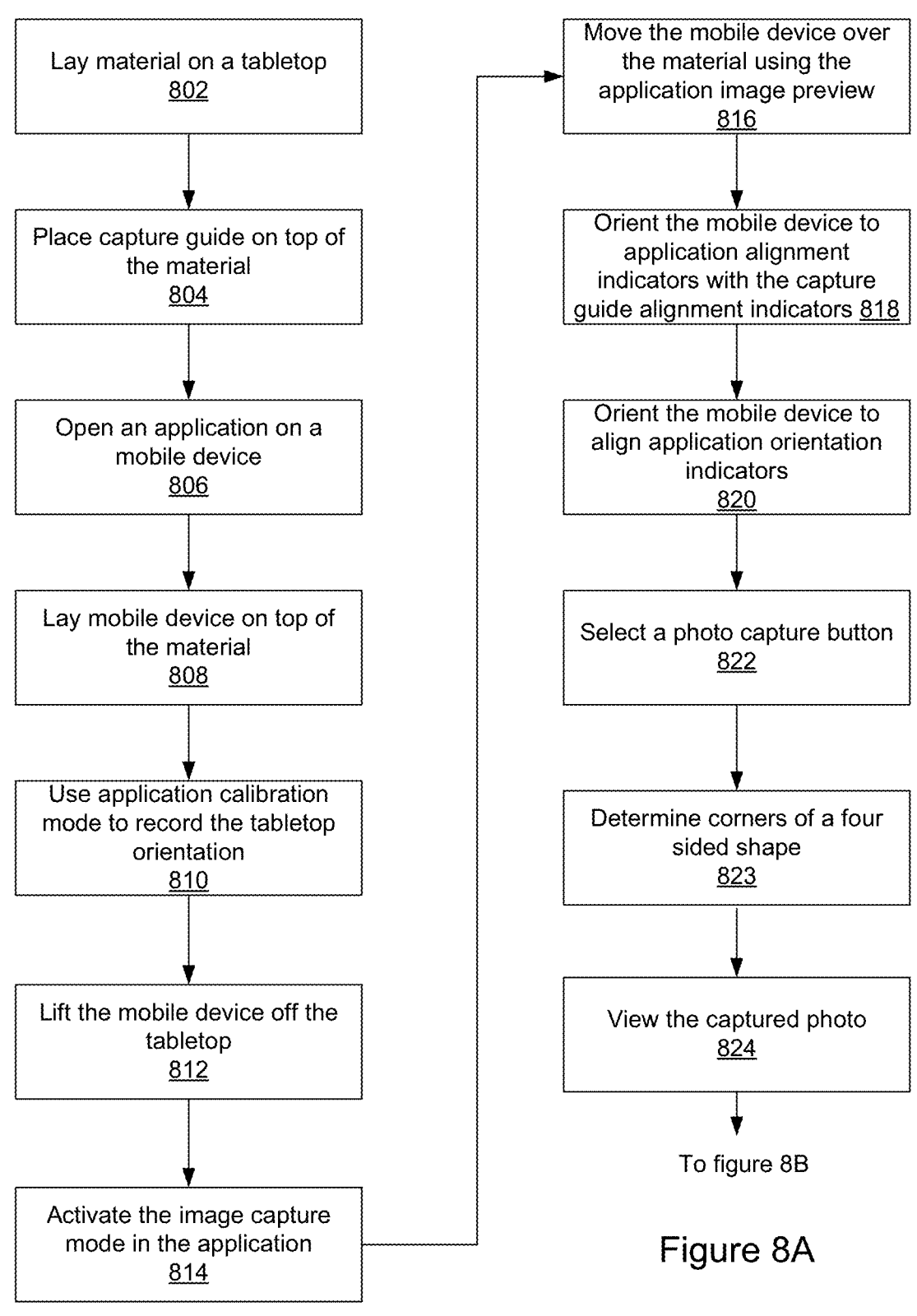
Figure 9:
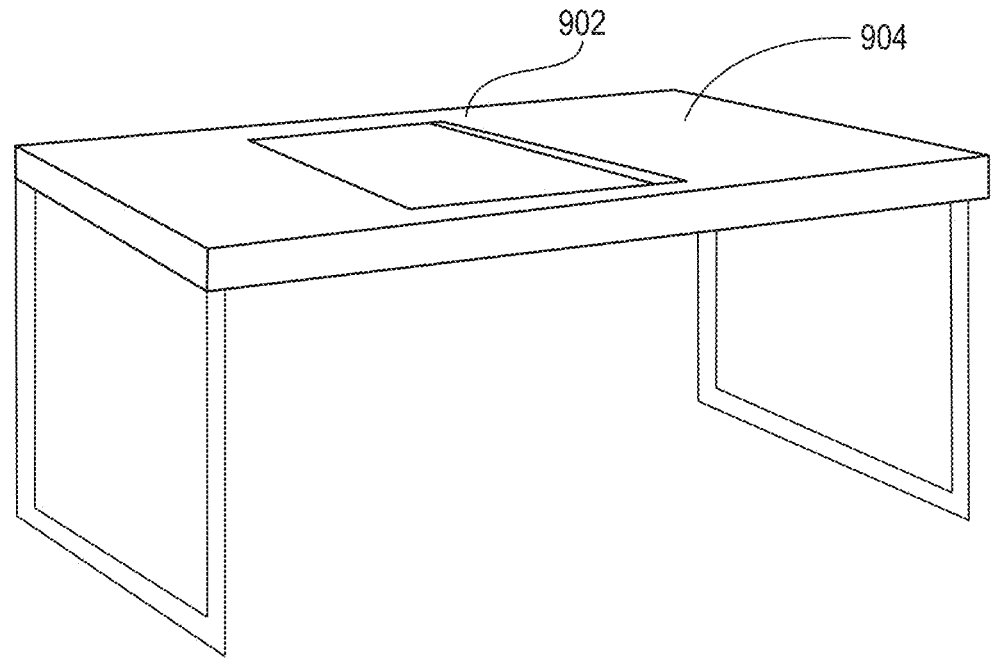
FIG. 9 shows an example of a sample material that is laid flat on a tabletop.

FIGS. 8A-8B show a sample flow of data collection by the material data collection system. In a step 802, a material is laid on a tabletop. Surfaces other than a tabletop may also be used, as long as a user may lay the material on the surface while capturing data about the material. For example, the material may be laid on the ground, a book, pad, or other flat surfaces available. FIG. 9 shows an example of a sample material 902 that is laid flat on a tabletop 904, according to an embodiment of the material data collection system. The sample material 902 is capable of being flattened or at least substantially flattened, such as a sample of fabric. One or more areas of the material may be captured by the material data collection system, such as where there are more than one instance of a pattern or design present on the fabric that needs to be captured.

In an implementation, the material data collection system may be used to capture data about any material that is capable of being flattened or substantially flattened. This may allow the material data collection system to fully capture details of the material, without shadows or other artifacts that may appear when capturing an object with irregular indentations or levels. Alternate embodiments of the material data collection system may include irregularly shaped materials.

In a step 804, the material data collection system includes a capture guide placed on top of the material. The capture guide is placed over a material to assist properly orient the material data collection system to capture material data. The capture guide may include indicators on the capture guide capable of both human and computer recognition for use in orienting captured data. The capture guide may be positioned so that a cut out portion of the capture guide includes an area of interest of the material. For example, it may be a representative area of the types of designs or elements of the material.

The capture guide may be of various sizes and shapes. In an implementation, the capture guide should be large enough to capture an entire pattern of a sample material within the cut-out window. Further, the capture guide may conform to various shapes and sizes of known objects that increase its portability or storage options. For example, the capture guide may conform to the letter (e.g., 215.9 by 279.4 millimeters) or A4 (e.g., 210 by 297 millimeters) paper sizes. This may allow users of the capture guide to include the capture guide in binders, folders, bags, pockets, or other carrying options that are already available.

In an implementation, the capture guide includes various thicknesses. As an example, the capture guide may be of 0.5, 1, 2, 3, 4, 5 millimeters of thickness, or other thickness. The capture guide should be of sufficient thickness so as to not be brittle and withstand numerous uses. However, the capture guide should not be so thick as to cause a shadow to appear when an image of it is captured by the material data collection system. For example, when capturing a digital image of the capture guide, the capture guide should be sufficiently thin so that the edges of the capture guide do not introduce shadows onto the sample material. A shadow may obscure or unnecessarily darken a portion of the sample material.

In an implementation, the material data collection system includes the dimensions of a capture guide, before it is included in a captured digital image. This allows the material data collection system to compute, with or without printed measurements on the capture guide surface itself, the size of a cut out section of the capture guide. For example, if a size of the cut-out section is known, the material data collection system may determine how much of the sample material appears.

Figure 10:
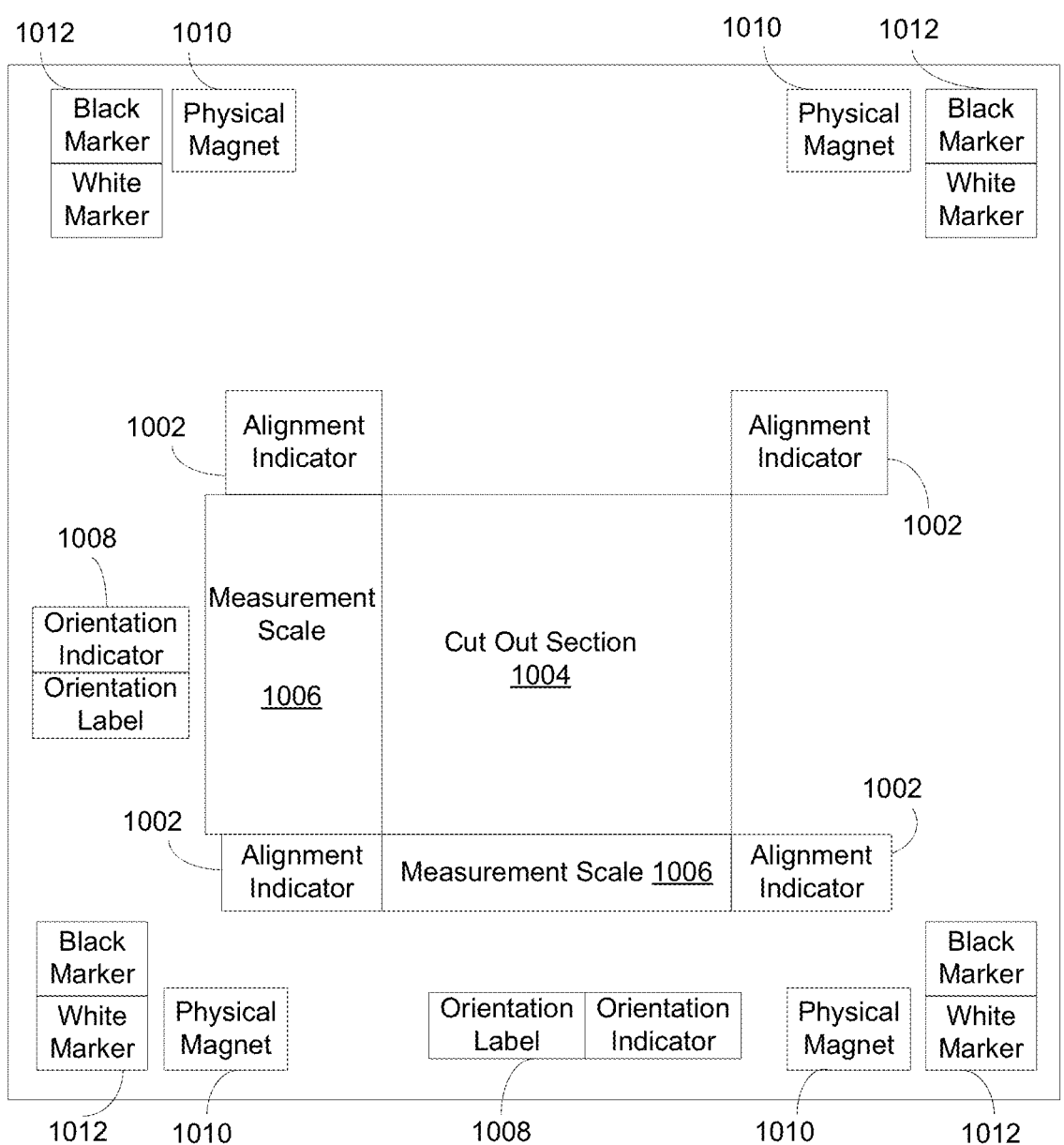
FIG. 10 shows a schematic of an example of a capture guide that may be used with the material data collection system.

FIG. 10 shows a schematic of an example of a capture guide that may be used with the material data collection system, in an embodiment. Alternate embodiments of the capture guide that may be used with the material data collection system may include more, fewer, or the same elements as shown on FIG. 10. The capture guide includes four alignment indicators 102 that orient data captured when using the capture guide. The four alignment indicators 1002 may form corners of a cut out portion 1004. The cut-out portion 1004 indicates where a material will be visible when the capture guide is in use. The cut-out portion 1004 may be of any shape, such as square, circular, rectangular, any sided-polygon, or other shape. This may depend on the number of alignment indicators for any given capture guide. The dimensions of the cut-out portion 1004 may be stored by the material data collection system as metadata associated with data captured from a sample. One or more of the alignment indicator may be both human operator readable (e.g., a person may view the markings on the capture guide to orient the material) or machine readable (e.g., a mobile device using a sensor, such as a camera, may identify the markings). The capture guide may also include one or more measurement scales 1006. The capture guide shown in FIG. 10 includes an x-axis and a y-axis measurement scale. The measurement scale may use one or more of any appropriate measurements, such as inches, centimeters, meters, feet, millimeters, or other measurements.

The example of the capture may include orientation indicators and orientation labels 1008. The orientation indicators and orientation labels 1008 may be used to indicate material specific characteristics of a sample being stored. For example, the orientation labels may provide a printed designation that may be read by a user to understand whether weft or warp is in a certain direction. This may assist the user when preparing the capture guide to be placed on a sample material, so that the capture guide is placed in the correct direction. The orientation indicators may include computer-readable indication whether weft or warp is in a certain direction. The orientation indicators may be readable by the material data collection system, without user input. In an embodiment, the orientation indicators and orientation labels 1008 may be combined into a format that is readable by both a human and computer.

In an implementation, a capture guide may also be adapted to material-specific characteristics that the capture guide is used with. Where the material data collection system is used with fabric or similar materials, the capture guide may include indications showing how to properly orient the capture guide depending on characteristics of the fabric.

Figure 11:
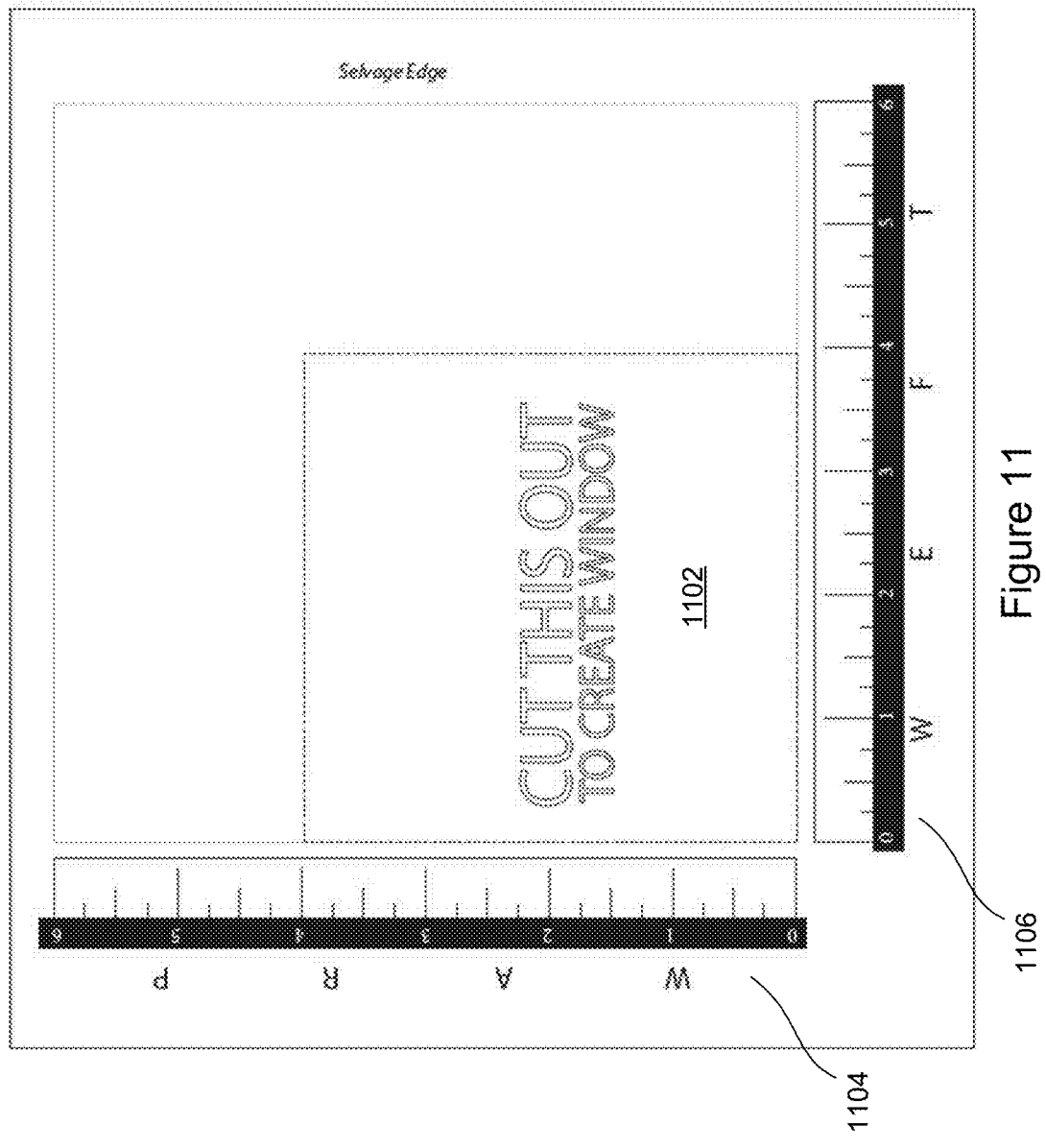
FIG. 11 shows an example of a particular capture guide that may be used with the material data collection system.

FIG. 11 shows an example of a capture guide that may be used with the material data collection system, in an embodiment. The capture guide may be of any construction that facilitates the material data collection system in capturing material data from a material. The other particular capture guide may be constructed of acrylic, plastic, paper, cardboard, or any material that allows the other particular capture guide to be placed upon a material and observed by the material data collection system. For example, when made of paper, a cut out portion 1102 may be included, which indicates where to cut the capture guide for use with sample material.

The other particular capture guide of FIG. 11 includes a vertical axis 1104 indicating "warp" and a horizontal axis

1106 indicating "weft." These may indicate a bias direction for a fabric being used with the capture guide. When fabric is constructed or woven, the weft (or woof) is the thread or yarn which is drawn through and inserted over-and-under, the lengthwise warp yarns that are held in tension on a frame or loom to create cloth. Warp is the lengthwise or longitudinal thread in a roll, while weft is the transverse thread. Proper alignment of the warp and weft when used with the capture guide allows a consistent orientation of data (e.g., digital image data) captured from samples. Alternate embodiments of the capture guide may also be adapted for use with other materials. For example, if the example material is a real or fake animal hide, it is important to note the grain or "spine" direction of the sample.

In an embodiment, a capture guide may be colored in a color adapted for use with digital image processing techniques. For example, other than markers indicating relevant colors located on the capture guide as explained in greater detail elsewhere, the capture guide may be painted in a digital green. This allows the mobile device to easily identify which areas of a captured digital image are part of the capture guide and which may be an area showing a sample material.

Figures 12, 13:
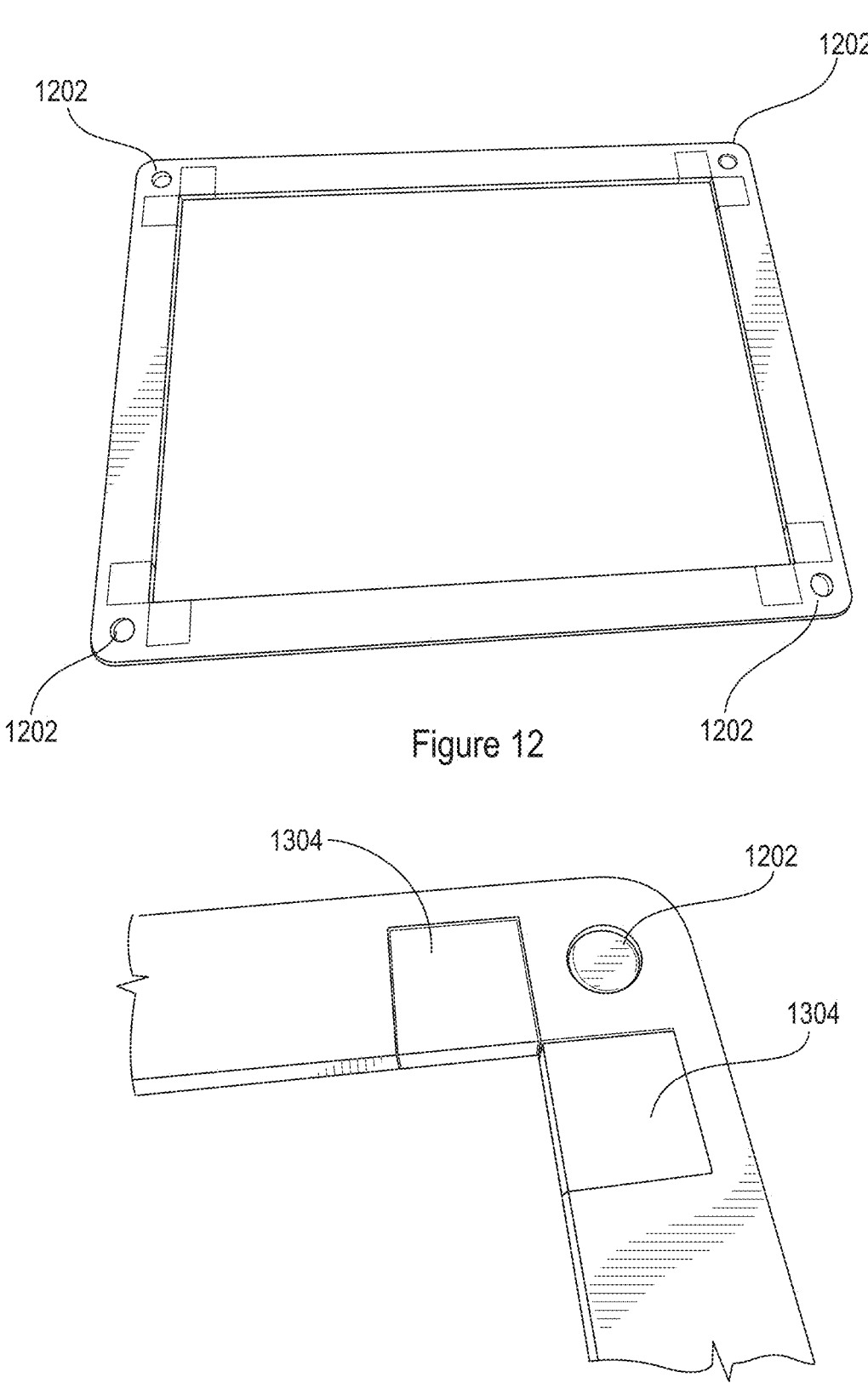
FIG. 12 shows an example of another capture guide in an isometric view.
FIG. 13 shows the example of the other capture guide in a close-up view of a corner of the other capture guide.

Returning to the schematic of an example of the capture guide of FIG. 10, the capture guide may include one or more magnets to properly position the capture guide on the tabletop. For example, the capture guide may include embedded magnets 1010. While the capture guide is being positioned on the tabletop with the material, the magnets may hold into place the capture guide while still allowing a user to make adjustments to the positioning. As another example, the tabletop may include a filing cabinet, such as a top of the filing cabinet. The filing cabinet may be constructed with metal, allowing the magnets embedded with the capture guide to adhere to the filing cabinet using magnetic force. Alternate embodiments of the material data collection system may include a tabletop or capture guide using clips, binders, straps, fasteners, VELCRO®, or other methods to maintain a proper position of the capture guide. FIG. 12 shows an example of a capture guide in an isometric view. FIG. 13 shows the example of the capture guide in a close-up view of a corner of the capture guide. The capture guide includes four holes 1202 that designate locations of the capture guide where a magnet may be placed.

Returning to FIG. 10, the schematic of the example of the capture guide includes four marker portions 1012. The marker portions 1012 include two different colors in this embodiment, such as a black marker portion and a white marker portion. The marker portions 1012 are also shown on FIG. 13 as marker portions 1304. The marker portion 1304 may include a black marker portion below the magnet 1302 and a white marker portion to the left of the magnet 1302. As explained in greater detail elsewhere, the markers 1012 may be used by the material data collection system to provide color or lighting calibration features.

Returning to FIG. 8A, in a step 806, an application on a mobile device is opened. The application may be a computer program running on the device that is used by a user to capture digital images. The application may be downloaded from an application store available from the mobile device manufacturer, or other sources where applications may be downloaded and installed on the mobile device. The mobile device may be any of a smartphone, tablet device, laptop, or other types of computing device. In an implementation, the mobile device includes different components such as a camera, a light, one or more orientation sensors, a touch screen, a data store, and a file store. Alternate embodiments may include one or more of the components separate from the mobile device, but communicately coupled to the mobile device to provide data from the component to the mobile device. For example, a digital single-lens reflex camera (DSLR) or mirrorless camera may provide digital images and associated information to the mobile device for use.

In a step 808, the mobile device is laid upon the tabletop. In a step 810, the material data collection system includes a calibration functionality to record the tabletop orientation. This feature allows the mobile device to capture the orientation of the tabletop. The mobile device records the orientation of the table to calibrate itself to eliminate the need for a fixture to hold the device. For example, a tabletop may be slightly tilted (e.g., one leg of the tabletop is shorter, the floor which the legs of the tabletop stand upon is uneven). This allows the material data collection system to capture high quality data about a material by noting the plane of the tabletop and potentially making adjustments based on this information. As another example, instead of a setup that fixes the position of the mobile device for image capture such as a tripod, the mobile device may be held by a user's hand. The user's hand may slightly shake or be tilted in one or more directions. With the tabletop orientation information, the material data collection system may perform alignment adjustments on an image.

For example, the calibration functionality includes access to one or more sensors of the mobile device. The mobile device uses the sensors to capture the orientation of the tabletop or other surface that the sample material may be placed upon. In an implementation, the material data collection system may use one or more accelerometers included with the mobile device to capture orientation information used by the material data collection system. For example, when placing the mobile device on the tabletop, the material data collection system may access information from one, two, three, or more accelerometers built into the mobile device.

In a step 812, the mobile device is lifted from the tabletop surface. In a step 814, the application enters into an image capture functionality of the material data collection system. In an implementation, the image capture functionality uses the mobile device camera, a light, and orientation sensors to capture various pieces of information while capturing an image of the material.

Figure 14:
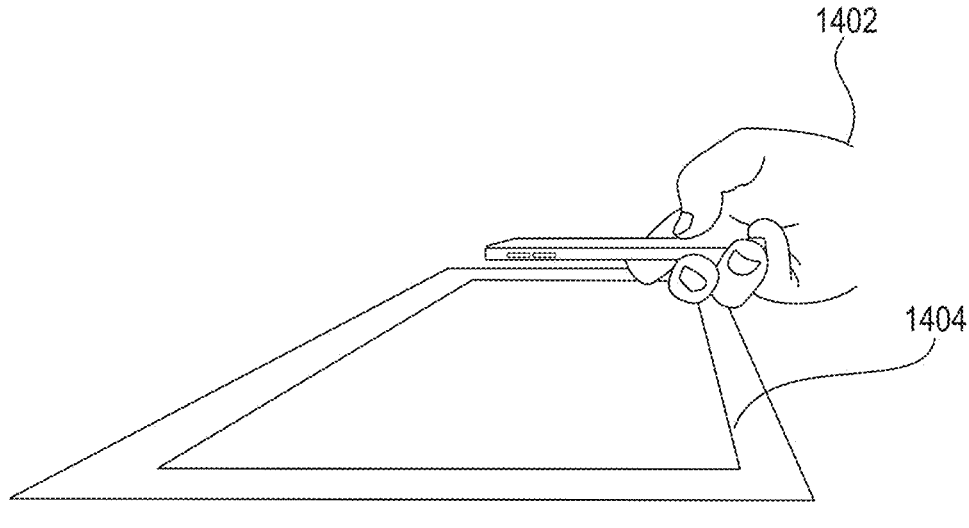
FIG. 14 shows an example of a user holding a mobile device while orienting the mobile device.

In a step 816, the material data collection system includes orienting or moving the mobile device while displaying an application image preview. FIG. 14 shows an example of a user holding a mobile device while orienting the mobile device. The user may hold the mobile device 1402 over a capture guide or material sample 1404 while performing this step.

In a step 818, the material data collection system includes orienting the mobile device to align orientation indicators provided by the application. In an implementation, the material data collection system may determine the appropriate distance of the camera and the capture guide, when performing alignment. For example, capturing images in high quality may require a certain distance between a lens of the mobile device's camera and a capture guide. The appropriate distance may be determined by a variety of factors, such as the type of lens included with the mobile device (e.g., macro lens, telephoto, and standard), level of detail of the sample material, focusing capabilities of the mobile device, or other.

In a step 820, the material data collection system includes aligning the mobile device to orientation indicators. For example, the plane of the camera and the plane of the tabletop should be aligned as closely as possible to be in the same plane. The tabletop orientation may be displayed by the application, so that a user of the material data collection system may attempt to correct the alignment if needed. The application may include displaying a difference between the camera and the tabletop orientation to assist proper alignment. The application may provide feedback to the user while showing the application image preview, to let the user know that, based on the application calibration mode of step 810, how to tilt or otherwise position the mobile device so that the orientation of the mobile device at any given moment is compared to the captured table top orientation.

In a step 822, the material data collection system may include selecting a photo capture functionality provided by the application. This allows the material data collection system to capture a digital image of the material presented before the camera, along with associated metadata. In an implementation, the material data collection system may include using a lighting or flash functionality of the camera. For example, if there is not enough lighting to properly illuminate the material with ambient light when the photo is taken or to remove shadows or other lighting artifacts, the light or flash functionality may illuminate the sample material before or during data capture of the material. The lighting or flash functionality of the camera may be manually enabled or disabled by a user, depending on their subjective requirements or evaluations of the lighting conditions.

In an implementation, the photo capture functionality of the material data collection system may not engage immediately after input is received to capture a photo. The application may automatically capture the photo when the orientation matches the accelerometer reading and the alignment indicators are all detected in the photo view. For example, the material data collection system may wait until the orientation of the tabletop and the mobile device are approximately the same. The material data collection system may instead enter into an intermediate stage, to detect whether a threshold orientation alignment is met before the photo is captured. When the intermediate stage is entered, the application may automatically capture the photo, display a message to the user to continue maintaining the orientation of the mobile device, or to make adjustments to the orientation before the photo is automatically captured based on the received input.

In a step 823, the material data collection system determines corners of a bounded area or a cut out section from an image captured by the photo capture functionality provided by the application. For example, as shown in FIG. 10, a capture guide may include alignment indicators 1002. Depending on a shape of the cut-out section 1004, one or more alignment indicators may be used by the material data collection system to form the cut-out section 1004. FIG. 10 shows an embodiment of the capture guide where the cut-out section 1004 is a square. Four alignment indicators 1002 are positioned at the corners of the cut-out section 1004.

In an implementation, the alignment indicators include a computer readable indicator. The application can automatically place the corners using the alignment indicators, which contain computer readable information regarding their location on the capture guide. The alignment indicators may be in a shape or size that is known by the material data collection system's application before an image of the capture guide is captured. The material data collection system may use an isolation algorithm to identify the alignment indicators and where they are located. This means that the material data collection system may interpret, using an image of a capture guide including alignment indicators, where the alignment indicators are positioned in the image, without user assistance. The computer readable indicator may be a QR code. The QR code may include information indicating which corner it corresponds to in the cut-out section. Additionally, corners of the alignment indicators may indicate where a corner of the cut-out section is located. For example, the alignment indicator may be located at a set distance from the corner of the QR code. Also, the isolated alignment indicators may be used with an edge detection algorithm to determine where the edges of the cut-out section are located. For example, if the cut-out section is rectangular or square, the material data collection system may use straight lines to connect different corners of the cut-out section with each other to form a bounded area. In an implementation, the material data collection system uses Canny edge detection. Using Canny edge detection, the material data collection system may perform the steps of: (1) finding the intensity gradients of an image; (2) applying non-maximum suppression to get rid of spurious responses to edge detection; (3) applying double threshold to determine potential edges; and (4) tracking edge by hysteresis to finalize the detection of edges by suppressing all the other edges that are weak and not connected to strong edges.

Figure 15:
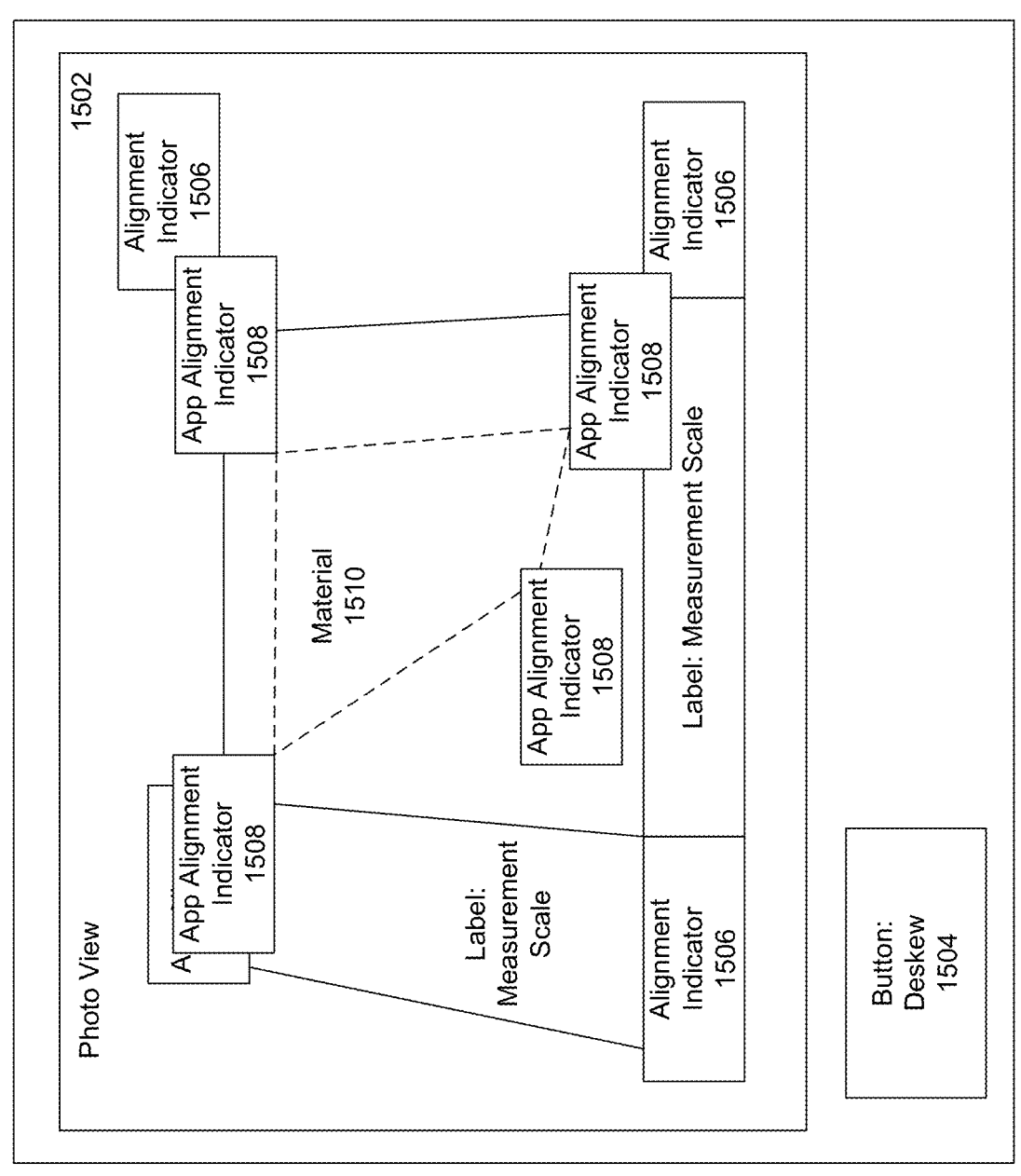
FIG. 15 shows an example screen capture of the material data collection system in the calibration functionality.

In a step 824, the material data collection system allows the captured photo of the material to be viewed. In a step 826, the material data collection system optionally includes an image adjustment functionality. The image adjustment functionality allows moving corners of the four-sided shape to match alignment indicators of the capture guide. For example, the corners may be application provided alignment indicators, generated by the application, for use in correcting alignment. FIG. 15 shows an example screen capture of the material data collection system in the calibration functionality, in an embodiment. The screen capture shows a live view portion 1502 and a deskew option 1504. In the live view portion 1502, the capture guide and material are shown. The live view portion 1502 shows a first set of alignment indicators 1506 included on the capture guide and captured by a camera of the mobile device. Additionally, the material data collection system includes in the live view portion a second set of application provided alignment indicators 1508 generated by the application. For each of the alignment indicators in the first set, there is a matching alignment indicator in the second set. A user of the material data collection system may provide appropriate input to adjust alignment indicators of the second set to match those of the first set. For example, if the mobile device is a smartphone including a touch screen, the user may tap, slide, or use other touch gestures to align the alignment indicators of the first and second sets. When adjusting the second set of application provided alignment indicators, the live view portion 1502 may display a sample material captured in the photo 1510 and update the sample material according to the adjustments at any given time. For example, by changing the second set of application provided alignment indicators, a polygon formed by the second set of application provided alignment indicators may change in shape. The sample material captured in the photo 1510 may be updated according to the changes to the second set of application provided alignment indicators.

In an embodiment, the material data collection system may include a deskewing feature. The deskewing feature may correct an image that is slanting too far in one direction, or one that is misaligned. The deskewing feature may be performed by the application, without input from a user as to how to deskew a captured digital image. For example, the user may select the deskew button shown in FIG. 15 to automatically deskew. The deskew feature implemented by the application may use various deskewing methods. For example, the application may apply four-point perspective transformation to the image. The deskew feature may take four points and transform the image so that the four points have ninety-degree corners. In an implementation, the four points may be alignment indicators captured in an image.

The material data collection system may also pass a maximum width and height. However, the material data collection system may need additional user input to correct a final aspect ratio is correct so that the material data collection system may vertically scale or horizontally scale the image. In an implementation, the material data collection system is aware of the size of a capture guide in a digital image. With the capture guide measurements, the material data collection system may use the alignment indicators to automatically position the four points to feed into the four-point perspective transformation algorithm. With the capture guide, the material data collection system knows the exact dimensions of the cutout portion, and the material data collection system may use this information to automatically apply the vertical or horizontal scaling to correct the image after the four-point perspective transformation is applied. Without the capture guide, a user may need to manually move the points to the correct location before applying the four-point perspective transformation.

Figure 16:
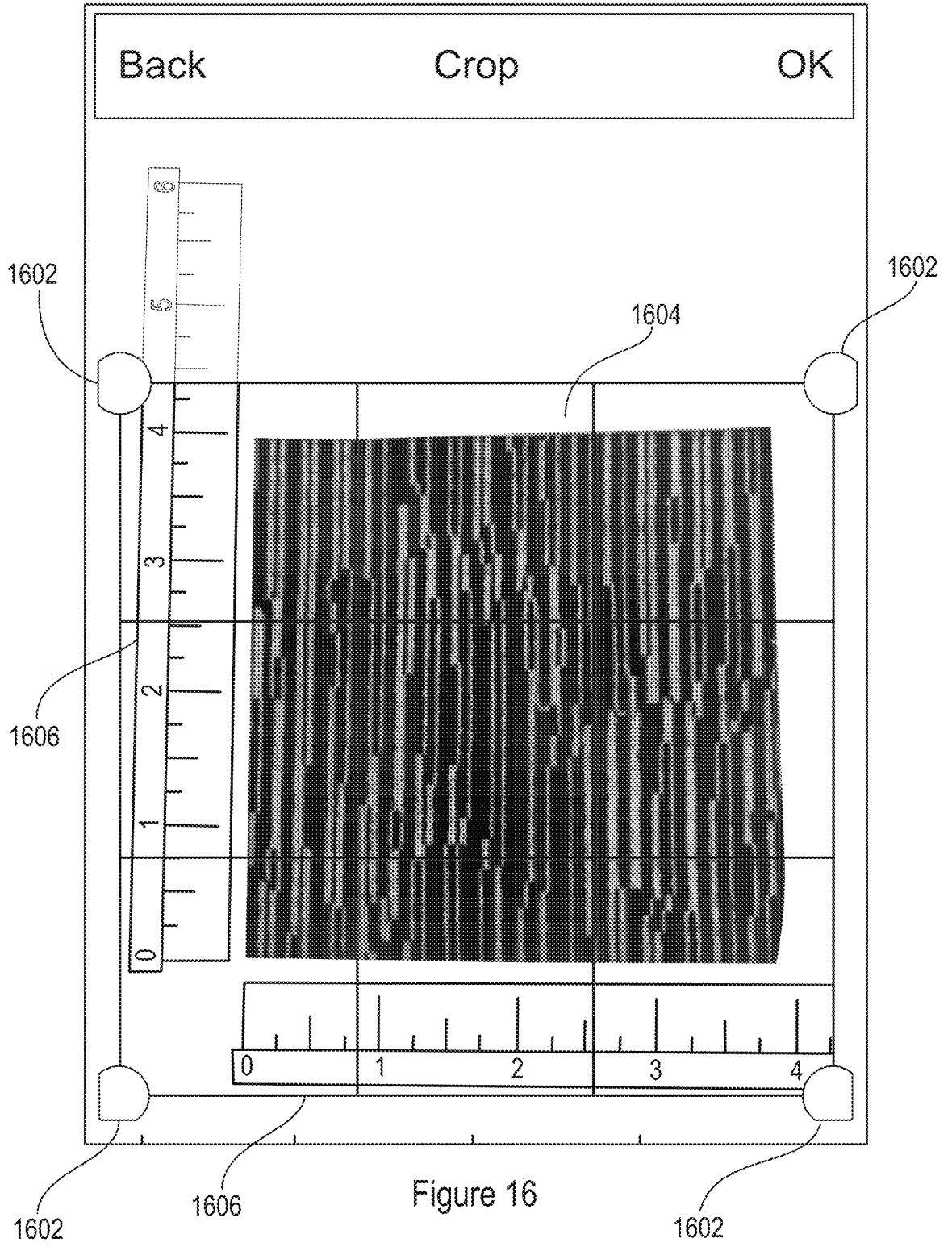
FIG. 16 shows a screen capture of an image adjustment functionality.

FIG. 16 shows a screen capture of an image adjustment functionality, in an embodiment. For example, if a photo of the material was at an inappropriate distance or incorrect orientation, the user may move the corners of the digital image to adjust the crop of the digital image. In FIG. 16, the digital image is a square, but the material data collection system may be adapted for use with any polygon shapes. In this example, a digital image has captured a sample material 1604 and measurement scales 1606. A user may adjust application provided alignment indicators 1602 to select the corners of the sample material.

In a step 828, the application transforms the digital image according to the input provided. The application can use the features detected in the photo together with the indicators on the capture guide to automatically apply transformations. Some examples of transformations possible include perspective transformation, rotation transformation, fisheye projection, and affine transformation. For example, the application uses the information specified by the four circular points to perform one or more of deskewing the digital image, rotating the image, scaling the image, or other adjustments. Further, the material data collection system may use positions of the application provided alignment indicators to remove the capture guide or calculate a transformation to remove lens aberration effects, such as lens warp or fisheye effect. In an implementation, the material data collection system applies a bump distortion transformation to the digital image to reverse the effects of the lens, like fisheye warping. With the capture guide, the material data collection system may use the edges of the capture guide to auto adjust the parameters of the transformation so that the pixels on the edges match a straight line between the cut-out section corners. The material data collection system may also transform the pictures by removing edges or corners of the digital images, for example to correct for a pin cushion effect.

In a step 830, the material data collection system selects black markers from the capture guide in the capture digital image. The black markers may contain computer readable information regarding their location on the capture guide. Alternate implementations of the material data collection system may include other markers, such as white markers, black markers, RYB, RYBGCM, or any combination of these.

In a step 832, the material data collection system selects calibration markers from the capture guide in the capture digital image. In an implementation, the material data collection system includes black or white markers or both to perform chromaticity correction. The material data collection system may also include color markers in conjunction with black or white markers to perform color correction. The markers may contain computer readable information regarding their location on the capture guide. For example, markers may be paired so that each marker indicates its location as compared to one or more other markers on the capture guide.

In a step 834, the material data collection system may perform corrections on the captured digital image. Embodiments of the material data collection system may perform color correction, chromaticity correction, or both using markers. Using the white and black markers, the application can apply a color correction to even the lighting and set the proper black and white points for the pixels. This may assist the material data collection system in generating a "true" color image for the captured digital image, that does not include any artifacts introduced by different lighting sources, intensities, or angles. For example, there may be overhead lighting, natural window lighting, shadow from the camera or camera user, and table lighting all captured in the same digital image. The material data collection system may adjust the captured digital image, so that variations of lighting introduced by the different lighting sources is corrected.

In the embodiment where a capture guide includes black or white markers to assist the material data collection system in color correction, the black or white markers may be included on the capture guide, in an area that does not obscure the sample. A black marker on the surface of the capture guide is colored flat black or RGB (0, 0, 0). This is used by color correction logic to adjust the photo pixels in a way to make the black marker a specific pixel color. A white marker on the surface of the capture guide may be flat white or RGB (255, 255, 255). This is used by the color correction logic to adjust the photo pixels in a way to make the white marker a specific pixel color. The material data collection system may use the color correction logic to adjust the colors of the image so that the white and black markers are all the same respective pixel color. In an implementation, the color correction logic may use Contrast Limited Adaptive Histogram Equalization (CLAHE).

The material data collection system may include analyzing markers found on the capture guide, to perform color analysis and adjustments. For example, the color analysis may adjust brightness across an image so that markers captured in the image are the same. This may make brightness across the image even. If the material data collection system determines that a captured digital image with a white marker located at one section of the capture guide is, in comparison to another white marker located at another section of the capture guide, that there is lighting discrepancy between the two points. The white marker may appear to be brighter (e.g., higher luminescence) than the other white marker. The material data collection system may make adjustments to the captured digital image to compensate for the difference. For example, the material data collection system may apply a gradient to make the captured digital image darker near the white marker and brighter near the other white marker. The material data collection system may consider any number of markers to determine adjustments need to a captured digital image. For example, if a particular capture guide includes four white markers and four black markers, the material data collection system may consider all eight markers or any subset of the markers to determine whether adjustments are necessary.

Alternate implementations may include markers with colors other than white and black to perform color correction. For example, instead of black and white, the capture guide may include a marker to calibrate a captured digital image in another color space, such as red-green-blue (RGB), ADOBE™ RGB, RYB, RYBGCM, or any other color space or subset of a color space. This may allow the same or a similar color temperature to be applied throughout the entire image.

In an implementation, the material data collection system may include both chromaticity correction and color correction for a single sample. The material data collection system may perform the chromaticity correction, before the color correction.

Returning to FIG. 8B, in a step 836, the material data collection system may select a crop region for repeat and preview. The application can automatically select a cropped region for the repeat, and the user can manually adjust the region as needed. This allows seamless stitching of the crop region when applied to a geometry. The material data collection system may modify the crop region to prepare the cropped region for application on a geometry. For example, the material data collection system may apply an edge blurring algorithm. In addition to performing alignment corrections when applying on a geometry, the material data collection system modifies edges so that possible edge artifacts are suppressed. That way, when a pattern from the cropped region is repeated, a stitching algorithm may stitch the pattern and reconcile how edges of the pattern should properly look when put together.

In an implementation, the material data collection system may include an edge detection algorithm that identifies where an instance of a pattern may be found in a captured digital image. Alternate implementations of the material data collection system may include user identification of where an instance of a pattern is found.

Figure 17:
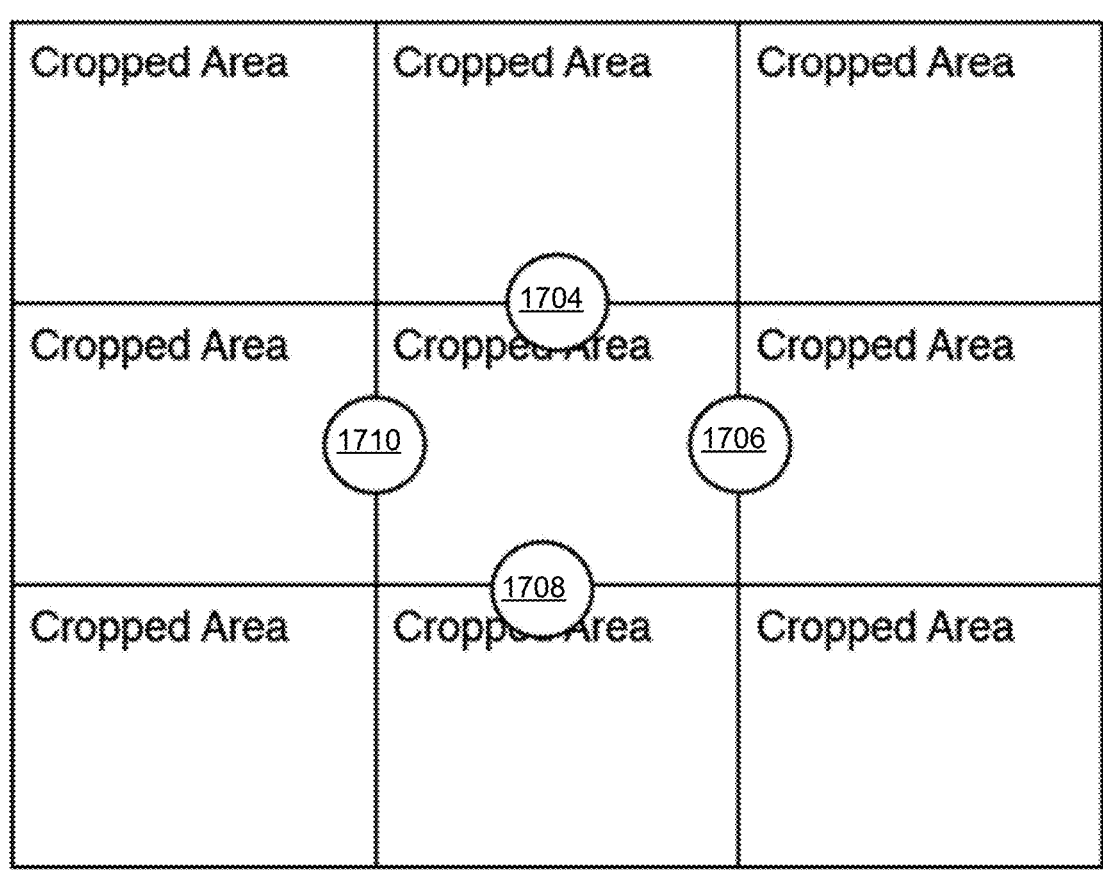
FIG. 17 shows a sample screen capture of a crop verification preview.

In a step 838, the material data collection system may adjust the edges of the cropped region to blend edges of the repeated crop region. Each crop region may include at least one complete instance of a pattern of the sample material. FIG. 17 shows a sample screen capture of a crop verification preview. This may allow a user to verify whether the cropped version of a sample material was correctly done or needs to be adjusted. If the user determines the cropped version does not accurately reflect the material, the user may retry and create a new cropped region. The crop verification preview may be displayed to a user, so that the user may confirm that the cropped version appears accurately when the cropped version is duplicated. In the example shown on FIG. 17, nine cropped areas 1702 are shown. Each cropped area may show the same cropped area. The cropped area may include patterns or designs, such as circles 1704, 1706, 1708, and 1710. As shown in FIG. 17, a user may view the repeated crop area and confirm that the cropped area was correctly identified, since the circles 1704, 1706, 1708, and 1710 correctly line up across multiple repeated cropped areas.

In a step 840, the material data collection system saves with the material data an uncropped version of the digital image. This may include the digital image showing the capture guide. The capture guide may include alignment indicators, labels, and measurement scales to assist a user that retrieves the material data in understanding the attributes of the material.

In a step 842, the material data collection system may save a cropped version or swatch of the digital image of the material. For example, the material shown in the digital image as shown in the cut-out portion of the capture guide may be stored separately, to provide a cleaner view of the material without the capture guide.

In a step 844, the material data collection system allows saving the digital image and associated metadata. In addition to the metadata described elsewhere in this application, relevant metadata may include a scale of the digital image, camera settings used when the digital image was captured (e.g., f/stop, whether flash was on, location information, brightness adjustments, ISO levels).

In a step 846, the material data collection system applies the cropped version of the sample material. For example, the cropped version of the sample material may correspond to a swatch sample of the fabric captured in the digital image. The swatch sample may be repeated horizontally or vertically as many times as needed to create a virtual fabric of desired size as it would appear on a geometry. The virtual fabric should look continuous, instead of a checkerboard effect where it is apparent that the virtual fabric is generated using stitched together sample swatches. Eventually the swatch sample can be applied to create images of clothing worn by people (e.g., showing how the fabric drapes, how the fabric would appear in different lighting).

The material data collection system may include various geometries, such as human forms, to apply the cropped version. The geometries may be used to model the sample material. The geometries may include different regions for different clothing items, such as a shirt region, a pants region, a dress region, or other regions. The cropped version is adjusted to conform to the contours of the geometry. The cropped version may be applied to one or more regions of the geometries and repeated one or more times, so that it appears as if the model is dressed in the sample material. In an implementation, the geometries are placed in a virtual reality background, such as using a mock background or an augmented reality background, so that a user may properly appreciate the model in a real-life space.

In an implementation, a swatch or cropped version of the sample material may indicate how to combine two or more instances of the swatch. Multiple instances of the swatch may be stitched together depending on dimensions of a geometry the swatch is being applied on. Larger geometries may require more instances of a swatch than for smaller geometries. For example, a first edge of a swatch may indicate how to align the first edge with a second edge that is opposite from the first edge on the swatch, while a third edge of the swatch may indicate how to align the third edge with a fourth edge that is opposite from the third edge on the swatch.

The material data collection system may also perform image scaling on a swatch. Instead of a manual process using photo editing software to ensure the captured dimensions for a swatch are correct, the material data collection system may automatically adjust the swatch dimensions. For example, a capture guide has known dimensions for a cut-out portion. So, when the capture guide is used, the sample material that appears in the cut-out portion should have the same or similar dimensions as the known dimensions. Because of tilting or other image issues however, the dimensions shown in the image may be incorrect. For example, if a cut-out portion is known to be 0.05 meters in width and 0.05 meters in height but a sample material capture using the capture guide shows dimensions of 0.049 meters in width and 0.052 meters in height, the material data collection system may adjust the swatch dimensions. In the example, the material data collection system may stretch the swatch in width and shrink the swatch in height.

In an implementation, the material data collection system uses a captured image and, based on the captured image, creates a material swatch using automated techniques. This means that, although options may be provided by the material data collection system for a user to review and make adjustments to the material swatch created, once the user indicates to capture the image, the material data collection system may perform the rest of the steps to create the material swatch.

In an implementation, the material data collection system allows swapping or recoloring of colors in a captured image. For example, a user may like a material captured by the material data collection system, but not a color the material is in. The material data collection system allows the user to swap the color from the color found in the image to one that they select, without needing to procure a new version of the sample material in a new color. In an implementation, the material data collection system swaps colors using the following method:

(1) A captured image of a generated swatch or other image is retrieved by the material data collection system.

(2) The captured image is converted into grayscale or desaturated. While in grayscale, the captured image maintains the intensity information of the original captured image, but with one or more colors found in the captured image transformed into gray.

(3) The user may select one or more new colors in the material data collection system to replace the one or more colors. The user may select the one or more new colors directly using a LAB value or from a palate of colors.

(4) The material data collection system applies the one or more new colors, using the intensity information from the grayscale captured image, to change the one or more colors into the one or more new colors. For example, the material data collection system may use a multiply command. The multiply command goes through pixels of the captured image and uses intensity information from the grayscale multiplied by the new color to swap colors. If there are two or more colors to be swapped, step (4) may be repeated as necessary.

In an implementation, the material data collection system uses a device's digital camera and tilt sensor, for the features as described above. However, the material data collection system does not use the device's accelerometer or distance sensor. Further, the material data collection system may not need to use autofocus camera distance information, or augmented reality features provided by the device (i.e., Augmented Reality such as ARKit in Apple Inc.'s iOS™, ARCore in Google's Android®) The material data collection system may understand distances of objects captured in the image using only the photographed capture guide.

In an implementation, the material data collection system allows metadata storage of colors found in a captured image. This allows users to make meaningful comparisons of different swatches and search for different colors, even if the color identifiers used are from a different color space. The metadata may be searchable, so that users can retrieve different samples using color identifiers from different color spaces. For example, pixels in the captured image may be represented in the material data collection system in either red, green, and blue (RGB), cyan, magenta, yellow, and black (CMYB), or hex formats. However, designers or other users may be more familiar with other color spaces, such as PANTONE CSI's Color Library™, or CHROMA. The material data collection system may convert the pixel color of the features in various embodiments of the material data collection system. Other digital image issues not listed below may also be corrected by the material data collection system.

TABLE

| Digital Image Issue | How to Detect | Automated Process to Resolve Issue |
|---|---|---|
| Pin cushion, barrel, or mustache distortion | Detect distortion based on a deviation from rectilinear projection | Apply Brown-Conrady model |
| Straighten/deskew | Analyze alignment indicators | Use one or more straight edges from a cut out portion of a capture guide as a straight edge and transform the digital image based upon the straight edge as captured in the digital image. |
| Misalignment | Analyze alignment indicators | Determine locations for alignment indicators. Overlay a digital image with the application provided alignment indicators. Optionally, allow adjustment of positions for the application provided indicators. Transform digital image, based on location of the application provided alignment indicators. |
| Color/lighting correction | Compare marker colors (e.g., black and white markers) | CLAHE |
| Dimensions of swatch out of proportion/image scaling | Compare dimensions of sample material area shown in an image to known dimensions of a cut out area. For example, if a cut out area is known to be a certain dimension, the sample material area should have similar dimensions. | Apply stretching or shrinking algorithm to adjust one or both height and width of swatch to known size of a cut out portion. |
| Edge artifact for swatch | Edges of a swatch do not properly match with another edge of the swatch if the swatch is stitched. | Provide cropped version or swatch in a crop verification preview. Allow adjustment to cropped version or swatch, if pattern or other features of a sample material are misaligned. An edge artifact algorithm may also be applied to prepare a swatch for stitching. | information into their corresponding color in any of these color spaces and store the information as metadata associated with the captured image. For example, a pixel may include the color information RGB 0 35 156, HEX 00239C, or CMYK 988200. However, in the PANTONE color space, this color may be known as Dark Blue C.

In an implementation, the material data collection system may generate the color metadata automatically, without user input to specifically generate the metadata. For example, the metadata may be automatically generated when a swatch is created or after color or brightness correction has occurred. The material data collection system may also generate the color metadata based on a user's input. For example, the user may select an area of the captured image to convert the color information in the area into a color identifier in a selected color space. In an implementation, the material data collection system may provide approximate conversions for colors. For example, some color spaces may not include the entire spectrum of possible colors. The material data collection system may attempt to find a closest match for the selected area.

In an implementation, the material data collection system includes one or more features to transform digital images. The table below illustrates an example of various issues and techniques that may be used by the material data collection system to resolve the issues. The material data collection system may support or apply one, two, three, or any number This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A method comprising:
providing a capture guide device comprising a first border in a first direction and a second border in a second direction, wherein the first direction is transverse to the second direction,
the first and second borders intersect at an origin point,
a first ruled scale is formed on the first border, extending from the origin point along the first border,
a second ruled scale is formed on the second border, extending from the origin point along the second border,
a first alignment indicator, formed in an intersection region of the first and second border,
a second alignment indicator, formed on the first border, distal from the intersection region, a third alignment indicator, formed on the second border, distal from the intersection region;

providing a mobile device comprising a camera and an operation to capture a material sample, comprising:

displaying on a screen of the mobile device a camera view of the material sample, held by the capture guide device, and the capture guide device as captured by the camera, and in the camera view, creating and displaying on the screen a first camera alignment indicator, a second camera alignment indicator, and a third camera alignment indicator;

capturing an initial material sample image using an application executing on the mobile device;

transforming the initial material sample image, based upon a bounded polygon formed using alignment indicators, to render an alignment corrected material sample image;

from the alignment corrected material sample image, identifying a sample material swatch area, wherein the sample material swatch area includes at least one instance of a pattern found in the initial material sample image; and storing on the mobile device the sample material swatch area and the initial material sample image.

2. The method of claim 1 wherein alignment indicators comprise the bounded polygon that comprises an irregular polygon.

3. The method of claim 1 wherein the set of alignment indicators included on the capture guide device forms a regular polygon.

4. The method of claim 1 wherein the transforming the initial material sample image comprises compensating, based on a first match alignment indicator pair, for at least a lens aberration introduced by a lens of the mobile device when capturing the initial material sample image.

5. The method of claim 1 comprising:

before capturing the initial material sample image, using fasteners of the capture guide device to hold the sample material in place.

6. The method of claim 1 comprising:

performing a color calibration of the initial material sample image based on a color marker of the capture guide device.

7. The method of claim 1 comprising:

performing a straightening of the initial material sample image based on a straight line defined by a cut out portion of the capture guide device.

8. The method of claim 1 comprising:

performing a dimensions correction of dimensions of a cut out portion of the capture guide device as shown in the initial material sample image.

9. The method of claim 1 comprising:

performing a deskewing of the initial material sample image based on a polygon formed by corners of a cut out portion of the capture guide device.

10. The method of claim 1 performing a color calibration comprising a comparison of two different markers on the capture guide that are of the same color.

11. A method comprising:

receiving a digital image of a real-world material sample;

analyzing the digital image to determine at least two marker areas found on a capture guide included with the digital image;

correcting, based on the at least two marker areas, a color of the digital image; and creating, after correcting the digital image, a cropped version of the digital image comprising:

identifying at least one pattern of the real-world material sample, and including the at least one pattern of the real-world material sample in the cropped version of the digital image.

12. The method of claim 11 wherein the at least two marker areas comprise at least three different colors and each of the at least two marker areas comprises the same colors.

13. The method of claim 12 wherein the correcting the digital image is based on a comparison of values for the at least three colors in the digital image and values for the at least three colors received before the digital image was captured.

14. The method of claim 13 wherein the at least three colors received before the digital image was captured comprises colors used during creation of the capture guide.

* * * * *